United States Patent
Van Dyck et al.

(10) Patent No.: US 12,271,340 B2
(45) Date of Patent: Apr. 8, 2025

(54) MANAGING EXPIRATION TIMES OF ARCHIVED OBJECTS

(71) Applicant: Cohesity, Inc., San Jose, CA (US)

(72) Inventors: Dane Van Dyck, Atlanta, GA (US); Praveen Kumar Yarlagadda, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 210 days.

(21) Appl. No.: 17/681,439

(22) Filed: Feb. 25, 2022

(65) Prior Publication Data

US 2023/0273897 A1   Aug. 31, 2023

(51) Int. Cl.
*G06F 16/11* (2019.01)

(52) U.S. Cl.
CPC ................... *G06F 16/113* (2019.01)

(58) Field of Classification Search
CPC .......................................... G06F 16/113
USPC ................................................ 707/665
See application file for complete search history.

(56) References Cited

U.S. PATENT DOCUMENTS

| | | | |
|---|---|---|---|
| 7,293,027 B2 | 11/2007 | Margolus | |
| 7,590,807 B2 * | 9/2009 | McGovern | G06F 3/067 711/159 |
| 9,166,989 B2 | 10/2015 | Huang | |
| 10,140,303 B1 | 11/2018 | Patterson | |
| 10,228,958 B1 * | 3/2019 | Rustad | G06F 9/505 |
| 10,235,417 B1 * | 3/2019 | Sterin | G06F 16/1805 |
| 11,086,545 B1 | 8/2021 | Dayal | |
| 11,748,299 B2 | 9/2023 | Yarlagadda et al. | |
| 2005/0055519 A1 | 3/2005 | Stuart | |
| 2005/0257400 A1 * | 11/2005 | Sommerer | G06F 16/954 36/13 |
| 2006/0143251 A1 * | 6/2006 | Peterson | H03M 7/30 |
| 2008/0263108 A1 * | 10/2008 | Herbst | G06F 16/125 |
| 2011/0238935 A1 * | 9/2011 | Meehan | G06F 16/20 711/E12.001 |
| 2012/0117029 A1 | 5/2012 | Gold | |
| 2013/0080395 A1 * | 3/2013 | Gong | G06F 16/21 707/661 |
| 2013/0159648 A1 | 6/2013 | Anglin et al. | |
| 2015/0066873 A1 | 3/2015 | Voruganti | |
| 2017/0169038 A1 * | 6/2017 | Borate | G06F 16/1873 |
| 2017/0212915 A1 * | 7/2017 | Borate | G06F 11/1448 |

(Continued)

OTHER PUBLICATIONS

Cohesity, "Architecture Matters Cohesity vs Dell EMC PowerScale (previously Dell EMC Isilon) NAS Scale-Out Limits", Cohesity, Sep. 2021, 11 pp., Retrieved from the Internet on Aug. 4, 2023 from URL: https://www.cohesity.com/resource-assets/white-paper/architecture-matters.pdf.

(Continued)

*Primary Examiner* — Joshua Bullock
(74) *Attorney, Agent, or Firm* — Shumaker & Sieffert, P.A.

(57) ABSTRACT

One or more objects associated with a source storage is determined to be archived to a remote storage. A corresponding minimum expiration time is stored in nodes of a tree data structure associated with an archive that represents the archived data associated with the source storage. At least a portion of the tree data structure associated with the archive is traversed to identify one or more nodes associated with one or more archived objects having a corresponding expiration time expiring before an expiration time associated with the archive.

18 Claims, 25 Drawing Sheets

(56) References Cited

U.S. PATENT DOCUMENTS

| | | |
|---|---|---|
| 2018/0267710 A1 | 9/2018 | Deshpande et al. |
| 2019/0340261 A1 | 11/2019 | Jain et al. |
| 2021/0042263 A1 | 2/2021 | Zdornov |
| 2021/0072928 A1* | 3/2021 | Winarski .............. G06F 3/0649 |
| 2021/0124648 A1 | 4/2021 | Srinivasan |
| 2021/0141698 A1 | 5/2021 | Bourgeois |
| 2021/0294774 A1 | 9/2021 | Keller |
| 2022/0066670 A1 | 3/2022 | Naik et al. |
| 2022/0083514 A1 | 3/2022 | Rath et al. |
| 2022/0121529 A1 | 4/2022 | Rath et al. |
| 2022/0382652 A1 | 12/2022 | Yadav et al. |
| 2022/0413968 A1 | 12/2022 | Yeger |
| 2023/0029616 A1 | 2/2023 | Pandit et al. |
| 2023/0032714 A1 | 2/2023 | Pandit et al. |
| 2023/0077938 A1 | 3/2023 | Yarlagadda et al. |
| 2023/0147671 A1 | 5/2023 | Narulkar |
| 2023/0244633 A1 | 8/2023 | Van Dyck et al. |

OTHER PUBLICATIONS

Cohesity, "Cohesity SpanFS and SnapTree", Cohesity, Sep. 2019, 11 pp., Retrieved from the Internet on Aug. 4, 2023 from URL: https://www.cohesity.com/resource-assets/white-paper/Cohesity-SpanFS-and-SnapTree-WP.pdf.

U.S. Appl. No. 18/183,659, filed Mar. 14, 2023, naming inventors Shankar et al.

VMware Customer Connect, "Cohesity Platform for Data Protection of VMware Cloud on AWS (80830)", Sep. 18, 2020, 10 pp., Retrieved from the Internet on Oct. 10, 2023 from URL: https://kb.vmware.com/s/article/80830#.

Bill Tolson, Cloud Archiving and Immutability; Azure offers WORM, Archive360.com, Sep. 20, 2018, https://www.archive360.com/blog/cloud-archiving-and-immutability-azu.

Ju-Lien Lim, Protecting Backup Archives with WORM and Tape Retention Lock, AWS Storage Blog, Aug. 19, 2020, https://aws.amazon.com/blogs/storage/protecting-archives-with-worm-an/.

Simha et al., "A Scalable Deduplication and Garbage Collection Engine for Incremental Backup", Association for Computing Machinery, Jun. 30, 2013, 12 pp.

\* cited by examiner

MANAGING EXPIRATION TIMES OF ARCHIVED OBJECTS

BACKGROUND OF THE INVENTION

Data associated with a source system (e.g., metadata, data content) may be archived to a cloud storage associated with a cloud storage provider. A user associated with the source system may have access (e.g., read or write) to the archived data that is stored in a cloud storage. The user associated with the source system may manually manage the archived data that is stored in the cloud storage, but accidentally delete some of the data due to a malicious attack (e.g., virus, ransomware) or human error. The user's credentials may be compromised and as a result, the archived data that is stored in the cloud may be subject to ransomware. The cloud storage provider provides the ability to establish a data lock for an archived object, which prevents a user from deleting or modifying the archived object during the data lock period. The data lock period may be associated with a compliance mode or a governance mode. In compliance mode, an archived object may not be deleted or modified, by any user, regardless of permissions. In governance mode, an archived object may not be deleted or modified, except for one or more users with special privileges. The data lock period begins at the time the data lock is applied to the one or more objects included in an archive (e.g., at the time of archive creation, in response to a user configuring a data lock for an archive, etc.) and may be extended if an archived object associated with a subsequent archive references data chunks associated with the archive.

BRIEF DESCRIPTION OF THE DRAWINGS

Various embodiments of the invention are disclosed in the following detailed description and the accompanying drawings.

DETAILED DESCRIPTION

Figure 1A:
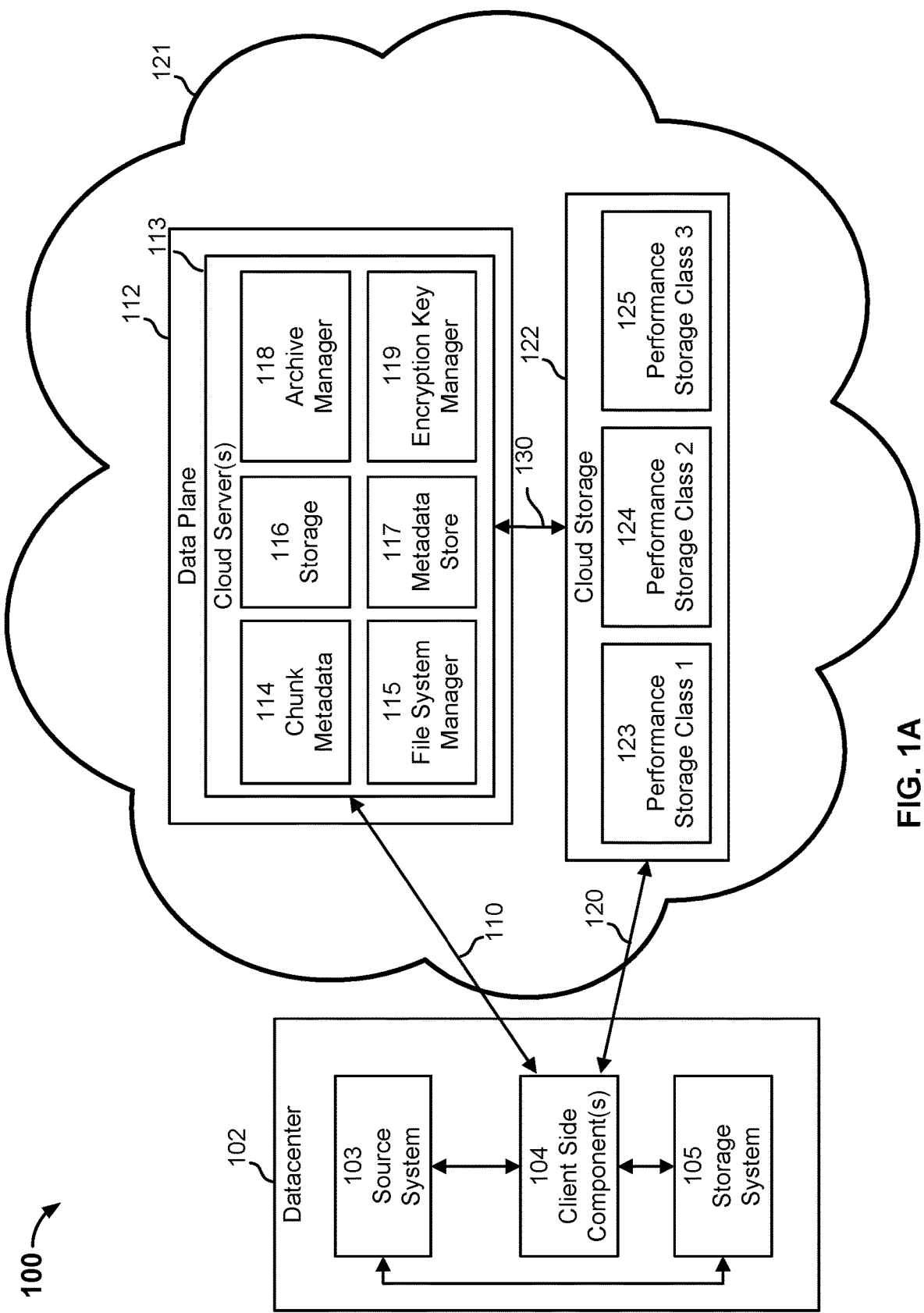
FIG. 1A is a block diagram illustrating a system for managing expiration times of archived objects in accordance with some embodiments.

Data associated with a source system is archived to a remote storage. An initial archive associated with the source system corresponds to a state associated with the source system at a first particular point in time. In some embodiments, the initial archive corresponds to a full archive of the source system. In some embodiments, the initial archive corresponds to a full archive of one or more objects associated with the source system. One or more subsequent archives associated with the source system may correspond to states associated with the source system at different points in time. In some embodiments, a subsequent archive corresponds to an incremental archive of the source system. In some embodiments, the subsequent archive corresponds to an incremental archive of one or more objects associated with the source system. Some of the data that was stored on the source system at the first particular point in time may also be stored on the source system at the different points in time. A subsequent incremental archive includes data that was not previously archived to the remote storage. Data included in a subsequent archive may be deduplicated against data included in one or more previous archives to reduce the amount of storage used.

The initial full archive and the one or more subsequent archives of the source system are associated with corresponding expiration times. An archive expiration time may be based on a retention period associated with an archive, or based on the retention period associated with the archive and a data lock period associated with the archive.

A retention period for an archive is the amount of time for which the archive and the data chunks it references are to be stored in cloud storage before the archive and the data chunks it references are eligible to be removed from cloud storage. The retention period for the archive begins when the archive is stored in cloud storage (e.g., archive creation time). An archived object containing data chunks referenced by an archive that is subject to a retention period, but not subject to a data lock period may be modified at any time prior to expiration of the retention period. The nature of such a modification must be to preserve the data referenced by the archive.

A data lock period for an archive is the minimum amount of time for which one or more archived objects associated with an archive are locked (e.g., write once read many (WORM) protected). In some embodiments, the one or more archived objects associated with the archive cannot be deleted or modified during the data lock period, by any user, regardless of permissions. In some embodiments, the one or more archived objects associated with the archive cannot be deleted or modified during the data lock period, by any user, except for one or more users with special privileges. The data lock period begins at the time the data lock is applied to an archive (e.g., at the time of archive creation, when a user selects to apply a data lock to an archive, etc.) and the data lock period associated with an archive may be extended but never reduced.

An expiration time may be specified for an archive prior to the archive being stored or after the archive is stored in cloud storage. The expiration time may be specified in a data management policy associated with the archive. An expiration time for one or more data chunks associated with the archive may be extended when one or more archived objects associated with one or more subsequent archives are stored in the cloud storage and include corresponding references to the one or more data chunks associated with the archive.

When the expiration time associated with an archive expires, one or more data chunks associated with the archive may be removed from the remote storage via a garbage collection process. Archived object(s) associated with the one or more subsequent archives may reference one or more data chunks included in an object associated with an expired archive. However, removing these referenced data chunks would cause data corruption issues for the one or more subsequent archives because the archived object(s) associated with the one or more subsequent archives would be missing data chunks necessary to recover the archived object(s). An archived object may refer to a data object (e.g., archived files, archived virtual machines, archived databases, archived applications, archived containers, etc.).

A cloud storage provider provides the ability to establish a data lock and specify an expiration time for an archived object. The data lock prevents an archived object from being removed from cloud storage until an expiration time stored with the archived object has expired. A storage system provider may provide an entity associated with the source system the ability to specify a corresponding data management policy for each of the plurality of archives using the feature provided by the cloud storage provider. For example, a data management policy may specify a retention period for an archive and a data lock period for an archive.

The archive expiration time is the time when data associated with the archive may be assessed for garbage collection, which is the expiration time of the retention period or data lock period, whichever expires last. The archive expiration time is initially stored as the expiration time for the one or more objects included in the archive. The expiration time for an object included in a previous archive may be extended when a subsequent archive includes an object that references one or more data chunks associated with the previous archive object. Performing a compliance scan to determine whether to extend the corresponding expiration times for one or more archived objects referenced by a subsequent archive is a time and resource consuming process.

A plurality of tree data structures may be maintained that enable an archive manager to determine which archived object(s) associated with one or more previous archives are referenced by one or more archived objects associated with a subsequent archive. Each tree data structure corresponds to a state of a source system at a particular moment in time. An example of the tree data structure is a snapshot tree, which may be based on a B+ tree structure (or other type of tree structure in other embodiments).

The plurality of tree data structures may be linked such that one or more nodes associated with a tree data structure corresponding to a subsequent archive may reference one or more nodes associated with one or more tree data structures corresponding to one or more previous archives. The storage system may perform the subsequent archive by determining the differences between the tree data structure associated with a subsequent archive and the one or more tree data structures associated with one or more previous archives that are linked to the tree data structure associated with the subsequent archive. The storage system may further perform the subsequent archive by storing to a remote storage the data chunk(s) that are exclusive to the subsequent archive.

The expiration time for an archived object associated with a previous archive may need to be updated to be compliant with a data management policy associated with a subsequent archive in the event an archived object associated with the subsequent archive references one or more data chunks included in the archived object associated with the previous archive and the expiration time associated with the subsequent archive expires after the expiration time for the archived object associated with the previous archive. However, performing a compliance scan by comparing the corresponding expiration times for the one or more archived objects referenced by the subsequent archive to the expiration time associated with the subsequent archive is a resource and time-consuming process because the entire tree data structure corresponding to the subsequent archive may need to be traversed.

A technique to manage expiration times of archived objects is disclosed. The disclosed technique reduces the amount of time and resources needed to perform a compliance scan by reducing a portion of the tree data structure corresponding to the subsequent archive that needs to be traversed. Although the technique is described with respect to archived data, the disclosed technique herein may be applicable whenever a data management operation (e.g., backup, migration, replication, tiering, etc.) is performed for a cohort of data that is provided from a first storage system to a second storage system and stored at the second storage system.

An archive manager may determine to archive data associated with a source system (e.g., data content, metadata) to a remote storage upon one or more conditions associated with an archive policy being satisfied. The one or more conditions may include a certain amount of time passing since a previous archive, a threshold amount of data being changed since a previous backup snapshot, in response to a user command, a threshold number of incremental backup snapshots being performed since a previous archive, a frequency at which an object is modified within a particular time period, legal compliance, etc. An archive is comprised of one or more archived objects comprised of one or more corresponding chunk objects, one or more tree metadata objects, and an archive metadata object.

A chunk object is configured to store a plurality of data chunks that are associated with one or more archived objects (e.g., an archived file, an archived virtual machine, an archived database, an archived application, an archived container, an archived pod, etc.). The data content associated with the one or more archived objects is comprised of a plurality of chunk objects. Each chunk object is comprised of one or more data chunks. In some embodiments, an archived object associated with a subsequent archive references one or more data chunks of a chunk object associated with a previous archive because the data chunks stored at the remote storage are deduplicated.

A tree metadata object is configured to store metadata that enables the data chunks associated with an archived object to be located. The tree metadata object stores a serialized version of at least a portion of a tree data structure as a flat set of data. Each block of the tree metadata object corresponds to a node of the tree data structure. A minimum child expiration time is stored with a tree metadata object. The stored minimum child expiration time indicates that the tree metadata object does not reference a chunk object that has an expiration time that expires before minimum child expiration time.

An archive metadata object is configured to store metadata associated with an archive, which may include file system permissions (e.g., user access permissions to file system), type of object, timestamp associated with a source storage snapshot, a pointer to a block of a metadata object that corresponds to a root node of a tree data structure, expiration time, etc. Each archive is associated with a corresponding archive metadata object.

Initial Archive

In some embodiments, the archive manager causes an initial archive of data associated with the source system to be archived to the remote storage. In some embodiments, the initial archive corresponds to a full archive of the source system. In some embodiments, the initial archive corresponds to a full archive of one or more objects associated with the source system.

In some embodiments, an archive manager included in a cloud server causes the data associated with the source system to be archived from the source system to the remote storage. The archived data of the source system is stored at the remote storage in a plurality of chunk objects. A file system manager associated with the cloud server generates a tree data structure that enables the data chunks associated with the archived data of the source system to be located at the remote storage.

In some embodiments, an archive manager included in a storage system causes the data with the source system that was backed up from the source system to a storage system to be archived from the storage system to the remote storage. During backup, a file system manager of the storage system generated a tree data structure that enables the data chunks associated with the backup of the storage system to be located at the storage system. The archive manager utilizes the generated tree data structure to locate the data chunks associated with the backup and stores the located data chunks in a plurality of chunk objects at the remote storage.

The archive manager serializes the tree data structure into one or more tree metadata objects and stores the one or more tree metadata objects at the remote storage. The archive manager also stores an archive metadata object associated with the initial archive at the remote storage. The initial archive is comprised of one or more archived objects. A corresponding expiration time may be established for each of the one or more archived objects. The corresponding expiration time for each of the one or more archived objects associated with the initial archive is established to be an expiration time associated with the initial archive.

After the initial archive is completed, the archive manager stores a minimum expiration time associated with the initial archive in the tree data structure associated with the initial archive. The archive manager performs a post order traversal of the tree data structure associated with the initial archive in part by storing in each leaf node a corresponding minimum expiration time that indicates a minimum expiration time of the one or more archived objects to which the leaf node references.

In some embodiments, the remote storage does not store any other data besides data associated with the initial archive. In such embodiments, the corresponding minimum expiration time stored by a leaf node is the expiration time associated with the initial archive. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node. The archive manager does not subsequently perform a compliance scan because the data associated with the initial archive has not been deduplicated against any other data stored at the remote storage and any archived object referenced by a leaf node of the tree data structure will be compliant with a data management policy associated with the initial archive.

In some embodiments, the remote storage already stores data from other sources and data associated with the initial archive is deduplicated against the previously stored data. In such embodiments, the minimum expiration time stored in a leaf node is based on a minimum of an expiration time associated with the initial archive and the minimum child retention time of a tree metadata object associated with the leaf node. The minimum child retention time is the minimum expiration time of an archived object to which the tree metadata object associated with the leaf node references. The tree metadata object associated with the leaf node may reference one or more chunk objects associated with one or more archived objects having an expiration time that expires before the expiration time associated with the initial archive. For example, an expiration time associated with the initial archive may be 1/1/2022. The initial archive may include a leaf node that references a first object. The first object may include a first data chunk, a second data chunk, a third data chunk, and a fourth data chunk. When the first object is archived to cloud storage, the cloud storage may already store the first data chunk and the third data chunk, but not the second data chunk and the fourth data chunk. A tree metadata object associated with the leaf node may reference a first chunk object associated with a first previous archive that includes the first data chunk and having an expiration time of 12/1/2021, and a second chunk object associated with a second previous archive that includes the third data chunk and having an expiration time of 11/1/2021. The minimum child retention time of the tree metadata object associated with the leaf node is a minimum of an expiration time associated with the first previous archive or an expiration time associated with the second previous archive, which in this example is 11/1/2021. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node.

The archive manager subsequently performs a compliance scan because at least some of the data associated with the initial archive has been deduplicated against data previously stored at the remote storage. The archive manager performs the compliance scan by traversing some or all of the tree data structure associated with the initial archive to identify one or more leaf nodes associated with one or more archived objects having a corresponding minimum expiration time expiring before an expiration time associated with the initial archive. At each node, the archive manager compares the minimum expiration time stored by the node to an expiration time associated with the initial archive. In response to a determination that the minimum expiration time stored by a node expires before the expiration time associated with the initial archive, the archive manager further traverses the tree data structure from the node to a child node associated with the node unless the node is a leaf node. In response to a determination that the minimum expiration time stored by the node does not expire before the expiration time associated with the initial archive, the archive manager does not further traverse the tree data structure to any child nodes associated with the node. Instead, the archive manager traverses the tree data structure corresponding to the initial archive to a different node that is located on the same hierarchy level of the tree data structure as the node. The archive determines whether there are any more nodes on the same hierarchy level of the tree data structure. In response to a determination that there is at least one other node that is located on the same hierarchy level of the tree data structure as the node to inspect, the archive manager traverses to that node. In response to a determination that there are no more nodes that are located on the same hierarchy level of the tree data structure as the node to inspect, the traversal of the tree data structure corresponding to the initial archive ends.

For a leaf node storing a corresponding minimum expiration time that expires before the expiration time associated with the initial archive, the archive manager inspects the corresponding expiration times of the one or more archived objects to which the leaf node is associated. The archive manager identifies the one or more non-compliant archived objects having a corresponding expiration time that expires before the expiration time associated with the initial archive and updates the corresponding expiration time to be complaint with a data management policy associated with the initial archive (e.g., to be the expiration time associated with the initial archive).

Subsequent Archive

After the initial archive, the archive manager may perform one or more subsequent archives. A subsequent archive may be performed upon at least one of the one or more conditions associated with an archive policy described herein being satisfied. In some embodiments, a subsequent archive is an incremental archive. In some embodiments, the incremental archive is an incremental archive of a source system. In some embodiments, the incremental archive is an incremental archive of one or more objects associated with the source system. In some embodiments, a subsequent archive is a full archive. A subsequent archive may be a full archive after a threshold number of incremental archives have been performed. In some embodiments, the subsequent archive is a full archive of a source system. In some embodiments, the subsequent archive is a full archive of one or more objects associated with the source system.

In some embodiments, an archive manager included in a cloud server causes the data associated with the source system that was not previously archived to be archived from the source system to the remote storage. The archived data of the source system is stored at the remote storage in a plurality of chunk objects. A file system manager associated with the cloud server generates a tree data structure that enables the data chunks associated with the archived data of the source system to be located at the remote storage.

In some embodiments, an archive manager included in a storage system causes the data with the source system that was backed up from the source system to a storage system to be archived from the storage system to the remote storage. During backup, a file system manager of the storage system generated a tree data structure that enables the data chunks associated with the backup of the storage system to be located at the storage system. The archive manager utilizes the generated tree data structure to locate the data chunks associated with the backup that was not previously archived and stores the located data chunks in a plurality of chunk objects at the remote storage.

The archive manager serializes the tree data structure into one or more tree metadata objects and stores the one or more tree metadata objects at the remote storage. The archive manager also stores an archive metadata object associated with the initial archive at the remote storage. The subsequent archive is comprised of one or more archived objects. A corresponding expiration time may be established for each of the one or more archived objects. The corresponding expiration time for each of the one or more objects associated with the subsequent archive is established to be an expiration time associated with the subsequent archive.

After the subsequent archive is completed, the archive manager stores a minimum expiration time associated with the subsequent archive in the tree data structure associated with the subsequent archive. The archive manager performs a post order traversal of the tree data structure associated with the subsequent archive in part by storing in each leaf node a corresponding minimum expiration time that indicates a minimum expiration time of the one or more archived objects to which the leaf node references. Data associated with the subsequent archive may be deduplicated against previously stored data. The minimum expiration time stored in a leaf node is based on a minimum of an expiration time associated with the subsequent archive and the minimum child retention time of a tree metadata object associated with the leaf node. The tree metadata object associated with the leaf node may reference one or more chunk objects having an expiration time that expires before the expiration time associated with the subsequent archive. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node.

The archive manager subsequently performs a compliance scan by traversing some or all of the tree data structure associated with the subsequent archive to identify one or more leaf nodes associated with one or more archived objects having a corresponding minimum expiration time expiring before an expiration time associated with the subsequent archive. At each node, the archive manager compares the minimum expiration time stored by the node to an expiration time associated with the subsequent archive. In response to a determination that the minimum expiration time stored by a node expires before the expiration time associated with the subsequent archive, the archive manager further traverses the tree data structure from the node to a child node associated with the node unless the node is a leaf node. In response to a determination that the minimum expiration time stored by the node expires does not expire before the expiration time associated with the subsequent archive, the archive manager does not further traverse the tree data structure to any child nodes associated with the node. Instead, the archive manager traverses the tree data structure corresponding to the subsequent archive to a different node that is located on the same hierarchy level of the tree data structure as the node. The archive determines whether there are any more nodes on the same hierarchy level of the tree data structure. In response to a determination that there is at least one other node that is located on the same hierarchy level of the tree data structure as the node to inspect, the archive manager traverses to that node. In response to a determination that there are no more nodes that are located on the same hierarchy level of the tree data structure as the node to inspect, the traversal of the tree data structure corresponding to the subsequent archive ends.

For a leaf node storing a corresponding minimum expiration time that expires before the expiration time associated with the subsequent archive, the archive manager inspects the corresponding expiration times of the one or more archived objects to which the leaf node is associated. The archive manager identifies the one or more non-compliant archived objects having a corresponding expiration time that expires before the expiration time associated with the subsequent archive and updates the corresponding expiration time to be complaint with a data management policy associated with the subsequent archive (e.g., to be the expiration time associated with the subsequent archive).

FIG. 1A is a block diagram illustrating a system for managing expiration times of archived objects in accordance with some embodiments. In the example shown, system 100 includes a client-side component 104 that is connected to data plane 112 via connection 110 and connected to cloud storage 122 via connection 120. In some embodiments, connection 110 is a gRPC connection or other type of connection. In some embodiments, connection 120 is a HTTPS connection or other type of connection. In some embodiments, connections 110, 120 may be intermittent connections. The connection between client-side component 104 and data plane 112 or between client-side component 104 and cloud storage 122 may be a wireless or wired connection. Connections 110, 120 may communicate data and/or information via a local area network, a wide area network, a storage area network, campus area network, metropolitan area network, system area network, intranet, the Internet, and/or a combination thereof. Cloud server 113 is connected to cloud storage 122 via connection 130.

The one or more client-side components 104 are located in datacenter 102 (e.g., real datacenter or virtual datacenter) that is associated with an entity (e.g., a user, an organization, a business, an enterprise, a government, etc.). In some embodiments, one or more client-side components 104 are located in cloud environment 121, such as in data plane 112. A client-side component may be a virtual machine, a container, a server, an application, etc. The one or more client-side components 104 are connected (e.g., temporarily or persistently) to source system 103. In some embodiments, the one or more client-side components 104 are included in source system 103. In some embodiments, source system 103 is a primary system. In some embodiments, source system 103 is a secondary storage system that backed up data from other sources (not shown). Source system 103 may be comprised of one or more computing devices (e.g., servers, desktops, laptops, etc.).

In some embodiments, the one or more client-side components are included in a storage system 105. Storage system 105 is configured to back up content from source system 103. In some embodiments, the storage nodes of storage system 105 are homogenous nodes where each storage node has the same capabilities (e.g., processing, storage, memory, etc.). In some embodiments, at least one of the storage nodes of the secondary storage system is a heterogeneous node with different capabilities (e.g., processing, storage, memory, etc.) than the other storage nodes of secondary storage system.

In some embodiments, a storage node of storage system 105 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 105 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the secondary storage system. For example, the separate storage device may be segmented into 10 partitions and the secondary storage system may include 10 storage nodes. A storage node of the 10 storage nodes may be allocated one of the 10 partitions.

In some embodiments, a storage node of storage system 105 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the secondary storage system may include 10 storage nodes. A storage node of the 10 storage nodes may be allocated one of the 10 partitions.

Source system 103 includes content (e.g., virtual machines, applications, files, filesystem data, containers, metadata, database, etc.) that is to be archived to cloud storage 122. A client-side component is configured to receive the content to be archived from source system 103 and to archive the received content. In some embodiments, the client-side component is configured to archive some or all of the received content to cloud storage 122. In some embodiments, the client-side component is configured to archive some of the received content to cloud storage 122 via storage 116 included in data plane 112.

Data plane 112 is configured to orchestrate how content associated with source system 103 is stored in cloud storage 122. For example, content associated with source system 103 may be stored in a first performance storage class 123

(e.g., Amazon Simple Storage Service (S3)), a second performance storage class 124 (e.g., Amazon S3 Glacier), or a third performance storage class 125 (e.g., Amazon S3 Glacier Deep Archive). Although FIG. 1 depicts cloud storage 122 as having three performance storage classes, cloud storage 122 may have n performance storage classes. Each of the performance storage classes corresponds to an object storage provided by a cloud provider (e.g., Amazon Web Services™, Microsoft™ Azure, Google Cloud™, etc.) that provides cloud environment 121 (e.g., public cloud, private cloud, hybrid cloud, etc.). The speed at which data may be accessed is different depending on whether the data is stored in the first performance storage class 123, the second performance storage class 124, or the third performance storage class 125.

Data plane 112 includes one or more cloud servers 113 (e.g., one or more EC2 instances). The one or more cloud servers 113 may be associated with corresponding processors, corresponding memory, and corresponding storage. In some embodiments, data plane 112 includes multiple sets of one or more cloud servers 113. For example, data plane 113 may include a first set of one or more cloud servers 113 that is associated with a first region and a second set of one or more cloud servers 113 that is associated with a second region.

The one or more cloud servers 113 may receive an indication that a client-side component 104 stored one or more data chunks at chunk objects stored in a performance storage class of cloud storage 122. The received indication may indicate the client-side component has finalized sending the one or more data chunks.

File system manager 115 is configured to generate archive metadata for the one or more data chunks stored in the cloud storage by the client-side component. The archive metadata may be comprised of a plurality of data structures, such as a tree data structure, an archive chunk metadata data structure, and/or a chunk object metadata data structure. The one or more cloud servers 113 include a metadata store 117 that is configured to store the archive metadata. Metadata store 117 is included in a memory or a storage of cloud servers 113.

A tree data structure is configured to store metadata that enables data chunks associated with an archive to be located in cloud storage 122. The tree data structure is generated each time an archive of a snapshot of a source storage is performed. An example of the tree data structure is a snapshot tree, which may be based on a B+ tree structure (or other type of tree structure in other embodiments).

A snapshot tree may provide a view of a source storage of source system 103 at a particular point in time. The snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata (e.g., owner, created, last update, size, file permissions, etc.), data associated with an object that is less than or equal to a limit size (e.g., 256 kB), an identifier of a data brick, one or more pointers to one or more metadata structures (e.g., Blob structure), etc. A leaf node of the snapshot tree may correspond to an inode.

An object metadata structure may be generated for an object (e.g., a content file, a virtual machine, a container, an application, a database, etc.) that is greater than the limit size (e.g., 256 kB) and was included in the source system content that was archived to the cloud storage. The object metadata structure is configured to store the metadata associated with an object that enables the data chunks associated with the object to be located. The object metadata structure includes a root node, one or more levels of one or more intermediate nodes associated with the root node, and one or more leaf nodes associated with an intermediate node of the lowest intermediate level. An object metadata structure is similar to a snapshot tree, but a leaf node of an object metadata structure includes an identifier of a data brick associated with one or more data chunks of the object and metadata associated with the one or more data chunks (e.g., chunk identifier, chunk object identifier, etc.). A leaf node of the snapshot tree may include a pointer to a root node of the object metadata structure corresponding to an object. The location of the one or more data chunks associated with a data brick may be identified using an archive chunk metadata data structure and/or a chunk object metadata data structure.

An archive chunk metadata data structure (e.g., a table) includes a plurality of entries. Each entry associates a chunk identifier associated with a data chunk with a chunk object identifier corresponding to a chunk object storing the data chunk.

A chunk object metadata data structure (e.g., a table) includes a plurality of entries. Each entry corresponds to a chunk object and associates a chunk object identifier for the chunk object with one or more chunk identifiers corresponding to one or more data chunks stored in the chunk object and metadata associated with the chunk object (e.g., offset information of data chunks within the chunk object).

The one or more data chunks associated with a data brick may be located based on the archive chunk metadata data structure and the chunk object metadata data structure. For example, a first data brick having a first brick identifier may be associated with a first chunk identifier (e.g., secure hash algorithm 1 (SHA-1) hash value). The first chunk identifier may be used in conjunction with the archive chunk metadata data structure to identify a chunk object identifier. A chunk object having the identified chunk object identifier is comprised of a plurality of data chunks. The chunk object metadata data structure may be used to identify a corresponding location of a data chunk. The chunk object metadata data structure may include corresponding offset information for a data chunk within a chunk object. In some embodiments, a corresponding location for the one or more data chunks associated with the data brick are stored in a leaf node of a tree data structure.

File system manager 115 may generate a tree metadata object that corresponds to a tree data structure. A tree metadata object is a serialized version of at least a portion of a tree data structure and is comprised of a flat set of data that includes a plurality of data blocks where each data block of the flat set of data corresponds to a node of the tree data structure. A data block that corresponds to a root node or intermediate node of the tree data structure includes a file offset to another data block of a flat set of data. A data block that corresponds to a leaf node of a snapshot tree includes a file offset to a data block corresponding to a root node of an object metadata structure. A data block that corresponds to a leaf node of an object metadata structure includes a reference to a storage location for one or more data chunks with which the leaf node is associated (e.g., a chunk object). A storage of a storage node of storage system 105 or cloud server 113 may be less reliable and/or more expensive than cloud storage 122. The metadata for the one or more data chunks may be serialized and stored at cloud storage 122 to ensure that the metadata for the one or more data chunks is not lost in the event the storage of a storage node or a cloud server fails.

Data plane 112 includes archive manager 118 that is configured to determine when data associated with source system 103 is to be archived to cloud storage 122 according to an archive policy. The archive policy may indicate an archive is to be performed periodically (e.g., daily, weekly, monthly, etc.), when an object is accessed less than an access frequency threshold period (e.g., accessed less than five times in the past six months), in response to a user command, a certain amount of time passing since a previous archive, a threshold amount of data being changed since a previous backup snapshot, a threshold number of incremental backup snapshots being performed since a previous archive, legal compliance, etc.

Archive manager 118 may provide to the one or more client-side components 104 a specification of content to be archived from source system 103 to cloud storage 122. In some embodiments, the specification of content describes a full archive of source system 103. In some embodiments, the specification of content describes an incremental archive of source system 103. An incremental archive of source system 103 includes data stored on source system 103 that was not previously archived. After a full archive of source system 103 is performed, the subsequent archives of source system 103 may be incremental archives (e.g., incremental forever). Data included in a subsequent incremental archive may be deduplicated against data included in one or more previous archives to reduce the amount of storage used by an entity associated with the source system. In some embodiments, data included in a subsequent incremental archive may be deduplicated against data in the same performance storage class, a different performance storage class, or other source systems associated with the entity. In some embodiments, the specification of content describes a performance storage class for the data associated with an archive. For example, the one or more client-side components 104 may provide the data associated with an archive of a snapshot of source system 103 to the first performance storage class 123, the second performance storage class 124, or the third performance storage class 125.

In some embodiments, the specification of content describes a full archive of an object included in source system 103. In some embodiments, the specification of content describes an incremental archive of an object included in source system 103. In some embodiments, the specification of content describes a performance storage class for one or more objects stored on source system 103. For example, the one or more client-side components 104 may tier an archive of an object stored on source system 103 to the first performance storage class 123, the second performance storage class 124, or the third performance storage class 125.

In some embodiments, the one or more client-side components 104 are configured to receive the content in a plurality of portions from source system 103. For each received portion of content, a client-side component divides the received portion of content into a plurality of data chunks. In some embodiments, a specification of content to be archived to cloud storage 122 is received from archive manager 118. In some embodiments, a specification of content to be archived to cloud storage 122 is received from source system 103. In some embodiments, the plurality of data chunks may be of variable size. The one or more client-side components 104 may generate corresponding chunk identifiers (e.g., SHA-1 identifier, SHA-2 identifier, SHA-256 identifier, etc.) for each of the plurality of data chunks included in a portion of received content.

A client-side component may identify one or more data chunks of the plurality of data chunks that are to be sent via network connection 120 to cloud storage 122 at least in part by sending to file system manager 115 the corresponding chunk identifiers for each of the plurality of data chunks included in a portion of received content. In response to receiving the corresponding chunk identifiers for each of the plurality of data chunks, file system manager 115 is configured to compare each of the corresponding chunk identifiers to chunk identifiers included in an archive chunk metadata data structure. The chunk identifiers included in the archive chunk metadata data structure indicate at least some of the data chunks that are stored in in the first performance storage class 123 of cloud storage 122.

File system manager 115 is configured to provide the client-side component a data structure that indicates the one or more chunk identifiers of the one or more received chunk identifiers that are not included in the archive chunk metadata data structure. In response to receiving the data structure, the client-side component is configured to use the data structure to identify the one or more data chunks of the portion of the received content that are to be sent via network connection 120 to be stored at cloud storage 122.

File system manager 115 may also provide an indication of one or more chunk objects of performance storage class 123 to which a client-side component may write the one or more data chunks associated with the one or more chunk identifiers included in the data structure. The indication of the one or more chunk objects includes corresponding chunk object identifiers for the one or more chunk objects. In some embodiments, the one or more chunk objects include one or more new chunk objects, one or more existing chunk objects, and/or one or more chunk objects yet to be created. In some embodiments, file system manager 115 periodically (e.g., every hour) provides to the one or more client-side components 104 an indication of a set of one or more chunk objects.

A client-side component may receive an encryption key from encryption key manager 119. Encryption key manager manages encryption keys for a plurality of storage tenants. The received encryption key is particular to the storage tenant. In some embodiments, the encryption key enables read access for a chunk object associated with the storage tenant at a credential level or write access for a new chunk object associated with the storage tenant at a credential level. In some embodiments, the encryption key enables read or write access for a new chunk object associated with the storage tenant at a prefix level. For example, a prefix may be a partial or full file path in the cloud storage. A prefix may be unique to a storage tenant. Some or all chunk objects of a particular storage tenant may be stored in cloud storage and share a prefix. The encryption key may expire after a particular amount of time. Source system 103 may be hacked and having the encryption key expire after the particular amount of time may prevent a hacker from accessing any of the chunk objects stored at cloud storage 122.

A client-side component may combine a plurality of the identified data chunks into one or more batches. The client-side component archives a batch of data chunks to cloud storage 122 by encrypting the data chunks included in the batch with the received encryption key and writing the encrypted data chunks to one of the chunk objects identified by file system manager 115. In some embodiments, the data chunks are compressed prior to being encrypted. The client-side component may write the encrypted data chunks to a chunk object associated with the first performance storage class 123, the second performance storage class 124, or the third performance storage class 125.

After a client-side component has written some or all of one or more batches of data chunks to one or more chunk objects of cloud storage 122, the one or more client-side components 104 may be configured to provide file system manager 115 an indication that the one or more chunk objects have been finalized. A chunk object may be finalized when cloud storage 122 receives and stores all of the plurality of data chunks associated with the chunk object. In response to receiving the indication, file system manager 115 is configured to complete generating metadata for the one or more data chunks stored in cloud storage 122 by one of the one or more client-side components 104. The metadata for the one or more data chunks may include a tree data structure, an archive chunk metadata data structure, and/or chunk object metadata data structure.

An archive stored at cloud storage 122 is comprised of chunk objects, one or more tree metadata objects, and an archive metadata object. A chunk object is configured to store a plurality of data chunks that are associated with one or more objects (e.g., a file, a virtual machine, a database, an application, a container, a pod, etc.). The data content associated with the one or more objects is comprised of a plurality of chunk objects. Each of the plurality of chunk objects is comprised of one or more data chunks.

A tree metadata object is configured to store metadata that enables the data chunks associated with an archived object to be located. The tree metadata object stores a serialized version of at least a portion of a tree data structure as a flat set of data. Each block of the tree metadata object corresponds to a node of the tree data structure.

An archive metadata object is configured to store metadata associated with an archive, which may include file system permissions (e.g., user access permissions to file system), type of object, timestamp associated with a source storage snapshot, a pointer to a block of a metadata object that corresponds to a root node of a tree data structure, expiration time, etc. Each archive is associated with a corresponding archive metadata object. The expiration time for an archive is stored in an archive metadata object associated with the archive that is stored in the cloud storage.

Figure 1B:
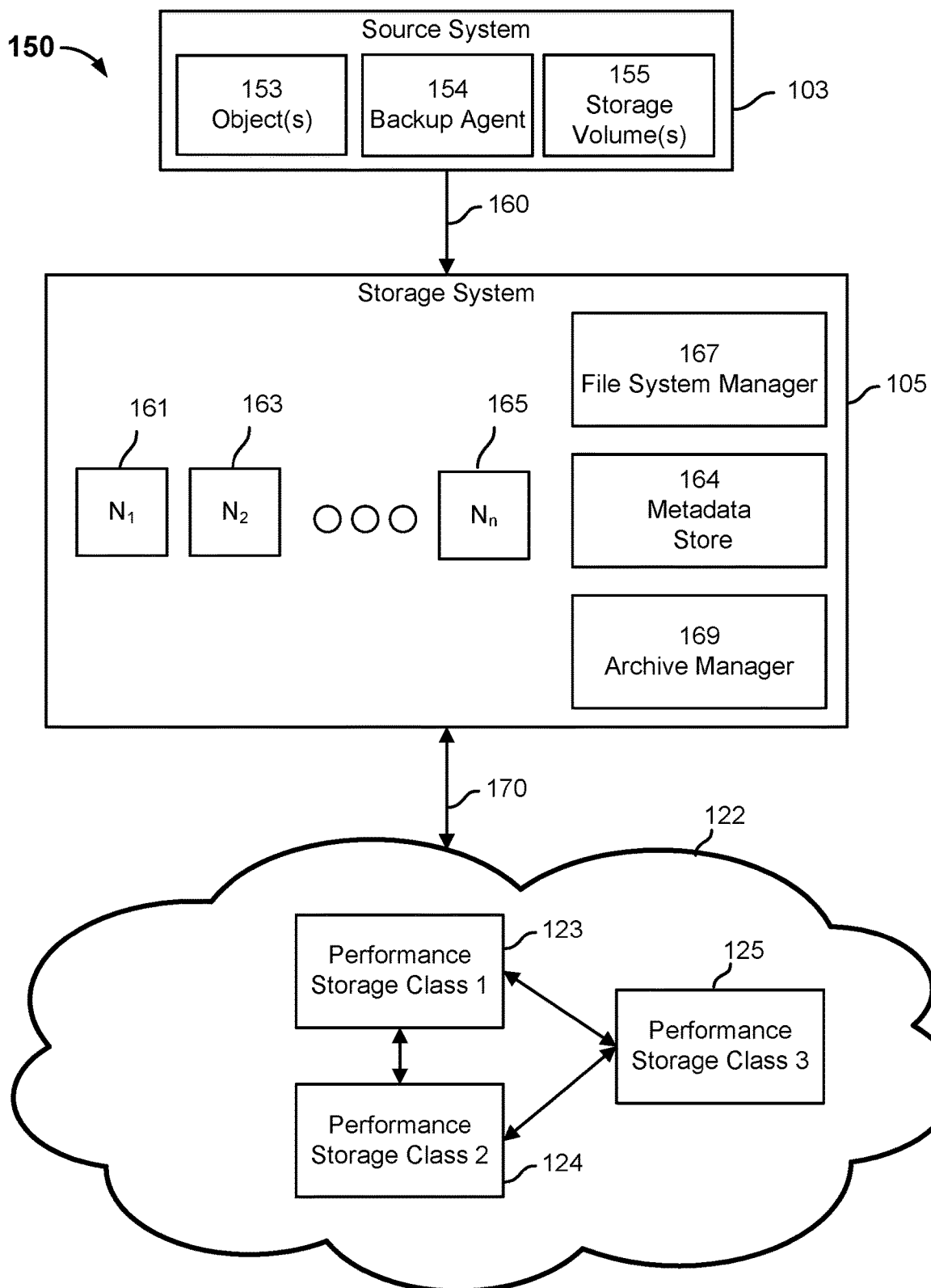
FIG. 1B is a block diagram illustrating a system for managing expiration times of archived objects in accordance with some embodiments.

FIG. 1B is a block diagram illustrating of a system for managing expiration times of archived objects in accordance with some embodiments. In the example shown, system 150 includes source system 103, a storage system 105, and a cloud storage 122.

Source system 103 is a computing system that stores file system data. The file system data may include a plurality of files (e.g., content files, text files, etc.) and metadata associated with the plurality of files (e.g., creation time, owner, modification time, file size, etc.). A file may be referred to as an object herein. Source system 103 may be configured to run one or more objects 153. Examples of objects include, but are not limited to, a virtual machine, a database, an application, a container, a pod, etc. Source system 103 may include one or more storage volumes 155 that are configured to store file system data associated with source system 103. The file system data associated with source system 103 includes the data associated with the one or more objects. Source system 103 may be comprised of one or more servers, one or more computing devices, one or more storage devices, and/or a combination thereof. Snapshots of source system 103 may be performed at different points in time and stored in one of the one or more storage volumes 155.

A backup of source system 103 may be performed according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with source system 103.

Backup agent 154 may be configured to cause source system 103 to perform a backup snapshot (e.g., a full backup snapshot or incremental backup snapshot). A full backup snapshot may include all of the file system data of source system 103 at a particular moment in time. In some embodiments, a full backup snapshot for a particular object of the one or more objects 153 is performed and the full backup snapshot of the particular object includes all of the object data (metadata, data content) associated with the particular object at a particular moment in time. In some embodiments, backup agent 154 is running on source system 103. In some embodiments, backup agent 154 is running in one of the one or more objects 153. In some embodiments, a backup agent 154 is running on source system 103 and a separate backup agent is running in one of the one or more objects 153. In some embodiments, an object includes a backup function and is configured to perform a backup snapshot on its own without backup agent 154. In some embodiments, source system 103 includes a backup function and is configured to perform a backup snapshot on its own without backup agent 154. In some embodiments, storage system 105 may provide instructions to source system 103, causing source system 103 to execute backup functions without backup agent 154.

Storage system 105 is comprised of a storage cluster that includes a plurality of storage nodes 161, 163, 165. Although three storage nodes are shown, storage system 105 may be comprised of n storage nodes. The storage nodes of storage system 105 may be configured in a manner as previously described. Storage system 105 may be configured to ingest a backup snapshot received from source system 103 and configured to store the data associated with the backup snapshot across the storage nodes 161, 163, 165 of the storage cluster.

Storage system 105 includes a file system manager 167 that is configured to organize the file system data of the backup snapshot using a tree data structure. The tree data structure may be used to capture different views of data. A view of data may correspond to a full backup snapshot, an incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of source system 103 or the one or more objects 153, or data generated on or by storage system 105 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 105 maintains fully hydrated restoration points. Any file associated with source system 105, an object at a particular time and the object's contents, or a file generated on or by the storage system, for which there is an associated reference restoration point, may be determined from the snapshot tree, regardless if the associated restoration point was a full reference restoration point or an intermediate reference restoration point.

Metadata store 164 is configured to store backup metadata, such as a plurality of tree data structures, a backup chunk metadata data structure, and a backup chunk file metadata data structure. The tree data structures generated by file system manager 167 are similar to the tree data structures generated by file system manager 115. Metadata store 164 may be stored in a memory or storage of storage nodes 161, 163, 165.

A backup chunk metadata data structure includes a plurality of entries. Each entry associates a chunk identifier associated with a data chunk with a chunk file identifier corresponding to a chunk file storing the data chunk.

A chunk file metadata data structure includes a plurality of entries. Each entry corresponds to a chunk file and associates a chunk file identifier for the chunk file with one or more chunk identifiers corresponding to one or more data chunks stored in the chunk file and metadata associated with the chunk file (e.g., offset information of data chunks within the chunk file).

The one or more data chunks associated with a data brick may be located based on the backup chunk metadata data structure and the chunk file metadata data structure. For example, a first data brick having a first brick identifier may be associated with a first chunk identifier (e.g., SHA-1 hash value). The first chunk identifier may be used in conjunction with the backup chunk metadata data structure to identify a chunk file identifier. A chunk file having the identified chunk file identifier is comprised of a plurality of data chunks. The chunk file metadata data structure may be used to identify a corresponding location of a data chunk. The chunk file metadata data structure may include corresponding offset information for a data chunk within a chunk file and/or a size for the data chunk.

Storage system 105 includes archive manager 169 that is configured to archive the backed data of source system 103 to cloud storage 122. The backed up data of source system 103 may be archived to the first performance storage class 123, the second performance storage class 124, or the third performance storage class 125. Archive manager 169 may perform a full archive or an incremental archive. A full archive includes the data that was included in a full backup snapshot of source system 103. An incremental archive includes the data that was included in an incremental backup snapshot of source system 103.

Metadata store 164 may include an archive chunk metadata data structure and a chunk object metadata data structure. Archive manager 169 may update the archive chunk metadata data structure and chunk object metadata data structure in a similar manner as archive manager 118.

Figure 2A:
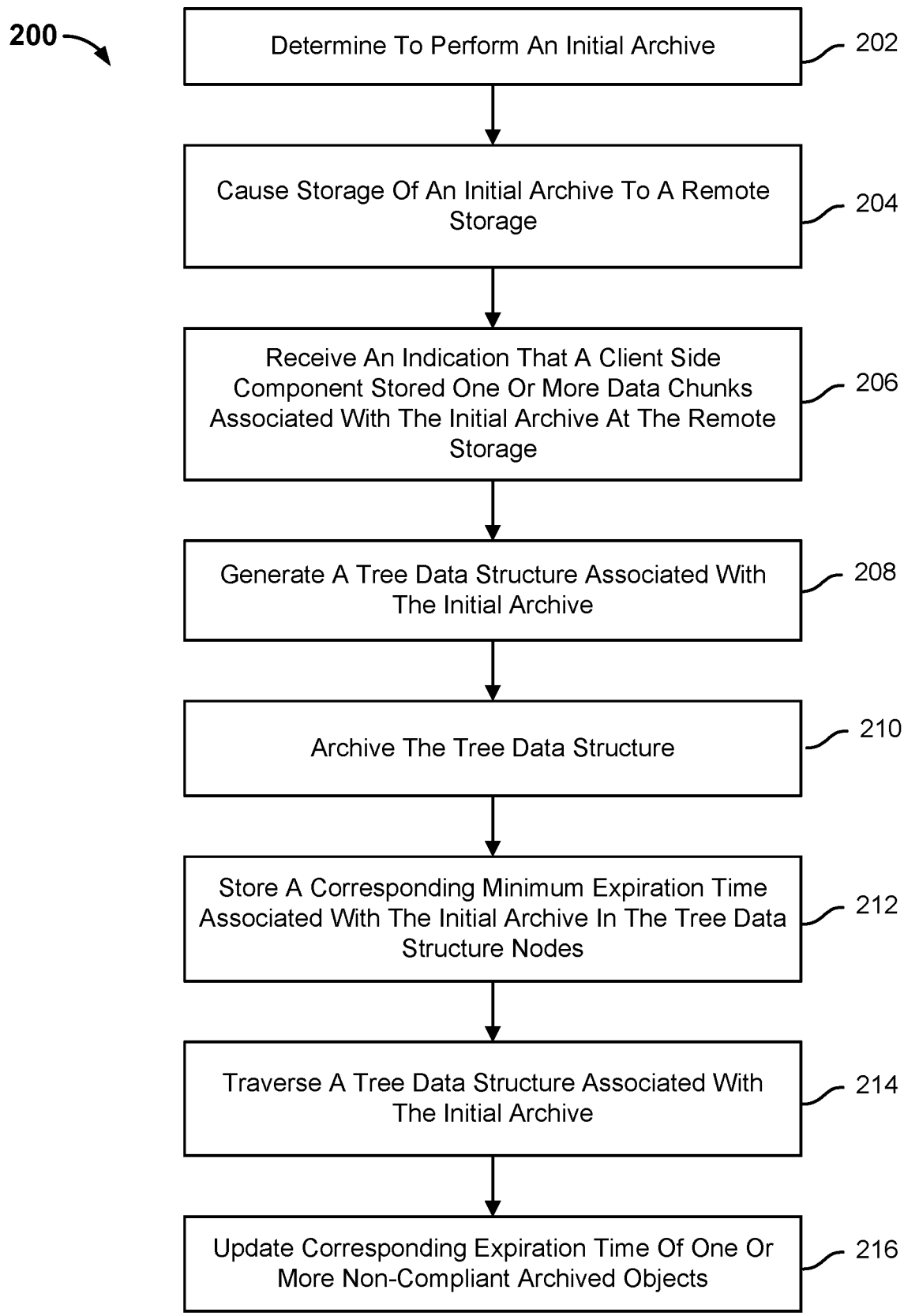
FIG. 2A is a flow diagram illustrating a process for managing expiration times of archived objects in accordance with some embodiments.

FIG. 2A is a flow diagram illustrating a process for managing expiration times of archived objects in accordance with some embodiments. In the example shown, process 200 may be implemented by an archive manager, such as archive manager 118.

At 202, an initial archive is determined to be performed. In some embodiments, the initial archive corresponds to a full archive of the source system. In some embodiments, the initial archive corresponds to a full archive of one or more objects associated with the source system.

At 204, the initial archive is caused to be stored to a remote storage. The initial archive is comprised of one or more archived objects. A corresponding expiration time may be established for each of the one or more archived objects. The corresponding expiration time for each of the one or more archived objects associated with the initial archive is established to be an expiration time associated with the initial archive.

An archive manager of a cloud server may determine that a condition associated with an archive policy has been satisfied and sends to a client-side component coupled to the source storage a specification of content to be archived from the source storage to the remote storage. In some embodiments, the specification of content to be archived for an initial archive describes a full archive of the source storage. In some embodiments, the specification of content to be archived describes a full archive of an object included in the source storage (e.g., file, virtual machine, container, application, etc.). In some embodiments, the specification of content to be archived for an initial archive describes a performance storage class for one or more objects stored in the source storage. In response to receiving the specification of content, the client-side component archives the backup snapshot.

In response to receiving the specification of content to be archived from the archive manager, the client-side component is configured to perform the initial archive by requesting the content from the source storage. The source storage utilizes a first snapshot of the source storage to provide the requested content in a plurality of portions to the client-side component. A portion of content may include metadata associated one or more objects stored in the source storage (e.g., owner, created, last update, size, permissions, etc.) and/or data content associated with the one or more objects stored in the source storage.

For each received portion of content, the client-side component divides the received portion of content into a plurality of data chunks, which may be variable-sized. The client-side component may generate corresponding chunk identifiers (e.g., SHA-1 identifier) for each of the plurality of data chunks included in a portion of received content, and provides data chunk metadata to a file system manager that is included in a cloud server.

In some embodiments, a source system chunks data associated with the content to be archived into a plurality of data chunks, determines a corresponding chunk identifier (e.g., SHA-1 hash value) for each of the plurality of data chunks, and sends the chunk identifiers to the client-side component. Subsequently, the client-side component provides data chunk metadata to the file system manager of a cloud server.

Data chunk metadata includes the corresponding chunk identifiers, corresponding data chunk sizes, and corresponding object offsets. The data chunk metadata indicates a sequence of data chunks within an object. For example, the data chunk metadata may indicate that a first data chunk having a chunk identifier of C1 is associated with an object offset of 0 MB-1 MB and has a data chunk size of 1 MB, a second data chunk having a chunk identifier of C2 is associated with an object offset of 1 MB-2 MB and has a data chunk of 1 MB, . . . , and an 8th data chunk identifier of C8 is associated with an object offset of 7 MB-8 MB and has a data chunk size of 1 MB.

In response to receiving the data chunk metadata, a file system manager of the cloud server may determine whether any of the one or more corresponding chunk identifiers are included in a chunk metadata data structure by comparing each of the corresponding chunk identifiers to chunk identifiers included in an archive chunk metadata data structure. The archive chunk metadata data structure stores information that associates a plurality of chunk identifiers with their corresponding chunk object identifiers. This indicates that a data chunk having a particular chunk identifier is stored in a chunk object having a particular chunk object identifier. The file system manager identifies the one or more chunk identifiers that are not included in the archive chunk metadata data structure and provides to the client-side component a data structure that includes the one or more identified chunk identifiers.

The file system manager provides an encryption key and a reference to a portion of a cloud storage where the one or more data chunks corresponding to the identified chunk identifiers are to be stored. The reference to a portion of the cloud storage may identify one or more chunk objects of the cloud storage to which the one or more data chunks are to be stored. The one or more chunk objects may include one or more new chunk objects, one or more existing chunk objects, and/or one or more chunk objects yet to be created.

In response to receiving the data structure, the encryption key, and the reference, the client-side component is configured to encrypt and write one or more data chunks corresponding to the one or more identified chunk identifiers to the one or more chunk objects associated with the provided reference location. In some embodiments, the client-side component has already chunked the one or more data chunks. In some embodiments, the client-side component requests from the source system the one or more data chunks identified in the data structure.

At 206, an indication that a client-side component stored one or more data chunks associated with the initial archive at the remote storage is received. For each received portion of content, the client-side component is configured to provide the file system manager an indication that the one or more data chunks corresponding to the one or more identified chunk identifiers were written to the provided reference location.

At 208, a tree data structure associated with the initial archive is generated. In response to receiving the indication from the client-side component, the file system manager is configured to generate metadata (e.g., tree data structure, archive chunk metadata data structure, chunk object metadata data structure) that enables the one or more written data chunks to be located at the cloud storage. After the initial archive is completed, the generated metadata provides a view (partial or complete) of the source storage at the first point in time. An archive manager may subsequently generate an archive metadata object and one or more tree metadata objects for the initial archive and store the generated objects at cloud storage.

At 210, the tree data structure is archived to the remote storage. The archive manager serializes the tree data structure into one or more tree metadata objects and stores the one or more tree metadata objects at the remote storage. Each of the one or more tree metadata objects is associated with a corresponding minimum child retention time.

At 212, a corresponding minimum expiration time associated with the initial archive is stored in the tree data structure nodes.

The archive manager performs a post order traversal of the tree data structure associated with the initial archive in part by storing in each leaf node a corresponding minimum expiration time that indicates a minimum expiration time of the one or more archived objects to which the leaf node references.

In some embodiments, the remote storage does not store any other data besides data associated with the initial archive. In such embodiments, the corresponding minimum expiration time stored by a leaf node is the expiration time associated with the initial archive. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node. The archive manager does not subsequently perform a compliance scan because the data associated with the initial archive has not been deduplicated against any other data stored at the remote storage and any archived object referenced by a leaf node of the tree data structure will be compliant with a data management policy associated with the initial archive. Process 200 ends in the event the remote storage does not store any other data besides data associated with the initial archive.

In some embodiments, the remote storage already stores data from other sources and data associated with the initial archive is deduplicated against the previously stored data. In such embodiments, the minimum expiration time stored in a leaf node is based on a minimum of an expiration time associated with the initial archive and the minimum child retention time of a tree metadata object associated with the leaf node. The tree metadata object associated with the leaf node may reference one or more chunk objects having an expiration time that expires before the expiration time associated with the initial archive. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node.

At 214, a tree data structure associated with the initial archive is traversed. A pre-order traversal of the generated tree data structure may be performed. The archive manager performs the compliance scan by traversing (e.g., pre-order traversal) some or all of the tree data structure associated with the initial archive to identify one or more leaf nodes associated with one or more archived objects having a corresponding minimum expiration time expiring before an expiration time associated with the initial archive. At each node, the archive manager compares the minimum expiration time stored by the node to an expiration time associated with the initial archive. In response to a determination that the minimum expiration time stored by a node expires before the expiration time associated with the initial archive, the archive manager further traverses the tree data structure from the node to a child node associated with the node unless the node is a leaf node. In response to a determination that the minimum expiration time stored by the node does not expire before the expiration time associated with the initial archive, the archive manager does not further traverse the tree data structure to any child nodes associated with the node. Instead, the archive manager traverses the tree data structure corresponding to the initial archive to a different node that is located on the same hierarchy level of the tree data structure as the node. The archive determines whether there are any more nodes on the same hierarchy level of the tree data structure. In response to a determination that there is at least one other node that is located on the same hierarchy level of the tree data structure as the node to inspect, the archive manager traverses to that node. In response to a determination that there are no more nodes that are located on the same hierarchy level of the tree data structure as the node to inspect, the traversal of the tree data structure corresponding to the initial archive ends.

At 216, a corresponding expiration time of one or more non-compliant archived objects is updated. For a leaf node storing a corresponding minimum expiration time that expires before the expiration time associated with the initial archive, the archive manager inspects the corresponding expiration times of the one or more archived objects to which the leaf node is associated. The archive manager identifies the one or more non-compliant archived objects having a corresponding expiration time that expires before the expiration time associated with the initial archive and updates the corresponding expiration time to be complaint with a data management policy associated with the initial archive (e.g., to be the expiration time associated with the initial archive).

Figure 2B:
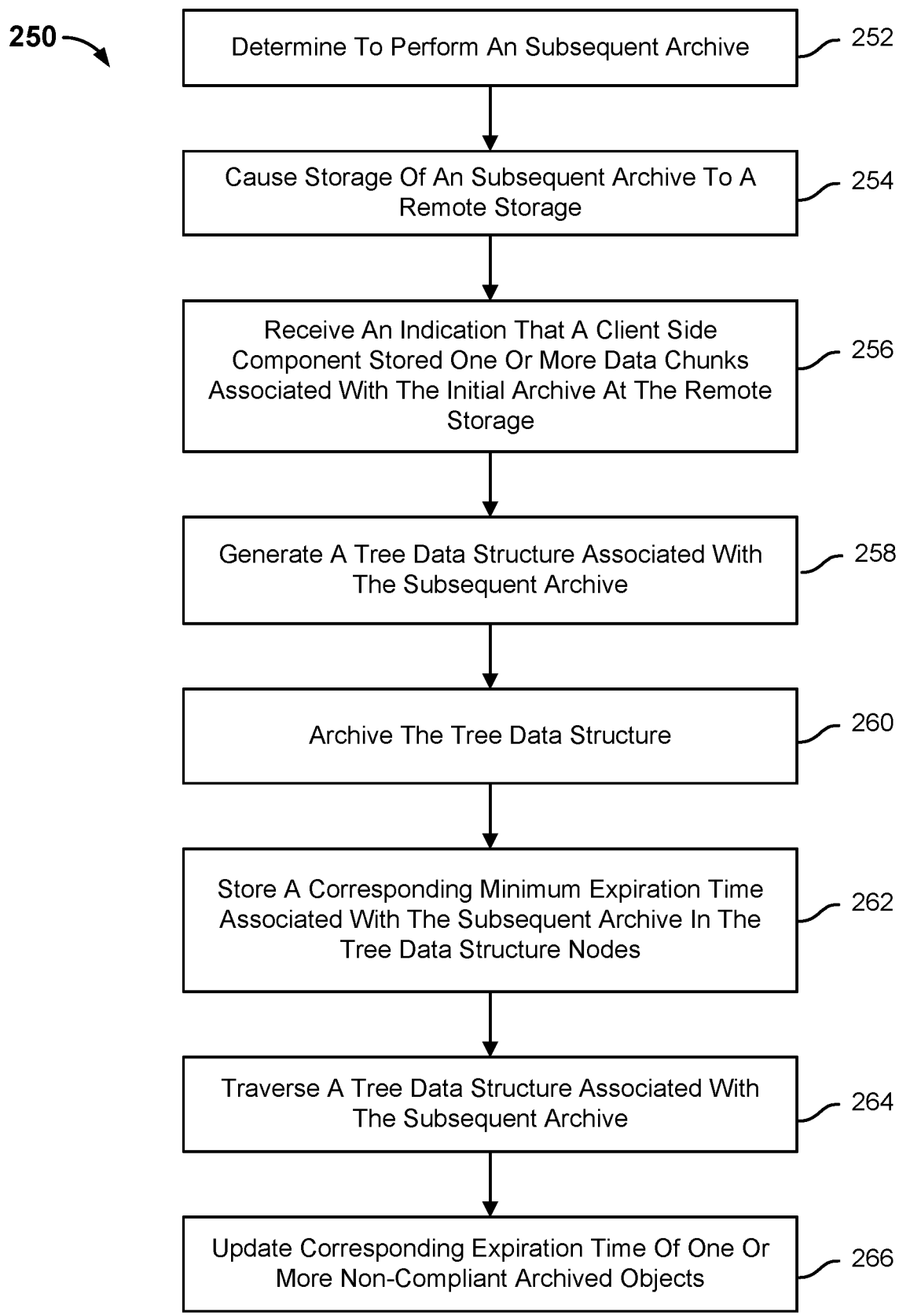
FIG. 2B is a flow diagram illustrating a process for managing expiration times of archived objects in accordance with some embodiments.

FIG. 2B is a flow diagram illustrating a process for managing expiration times of archived objects in accordance with some embodiments. In the example shown, process 250 may be implemented by an archive manager, such as archive manager 118.

At 252, a subsequent archive is determined to be performed. An archive manager may determine that a condition associated with the archive policy has been met. The one or more conditions may include a certain amount of time passing since a previous archive, a threshold amount of data being changed since a previous backup snapshot, in response to a user command, a threshold number of incremental backup snapshots being performed since a previous archive, a frequency at which an object is modified within a particular time period, legal compliance, etc.

At 254, the subsequent archive is caused to be stored to a remote storage. The subsequent archive is comprised of one or more archived objects. A corresponding expiration time may be established for each of the one or more archived objects. The corresponding expiration time for each of the one or more archived objects associated with the subsequent archive is established to be an expiration time associated with the subsequent archive.

The archive manager may send to a client-side component coupled to the source storage a specification of content to be archived from the source storage to the remote storage. In some embodiments, the specification of content for a subsequent archive describes an incremental archive of the source storage. An incremental archive of the source storage includes file system data that was not included in a previous archive of the source storage. In some embodiments, the specification of content for a subsequent archive describes an incremental archive of an object included in the source storage. An incremental archive of an object includes object data that was not included in a previous archive of the object. In some embodiments, the specification of content describes a performance storage class for one or more objects stored in the source storage.

In response to receiving the specification of content from the archive manager, the client-side component is configured to perform the subsequent archive by requesting the content from the source system. The source system utilizes a second snapshot to provide the requested subsequent archive content in a plurality of portions to the client-side component.

Similar to the first archive stored at 204, the client-side component requests and receives the subsequent archive content in a plurality of portions from the source system. For each received portion of content, the client-side component divides the received portion of content into a plurality of data chunks.

The client-side component may generate corresponding chunk identifiers (e.g., SHA-1 have value) for each of the plurality of data chunks included in a portion of received content. Data chunk metadata that includes the corresponding chunk identifiers, corresponding data chunk sizes, and corresponding object offsets are sent to a file system manager that is included in a cloud server.

In some embodiments, the source system chunks data associated with the content to be archived into a plurality of data chunks, determines a corresponding chunk identifier (e.g., SHA-1 hash value) for each of the plurality of data chunks, and sends the chunk identifiers to the client-side component. Subsequently, the client-side component provides data chunk metadata to the file system manager that is included in the cloud storage.

In response to receiving the data chunk metadata, the file system manager may determine whether any of the one or more corresponding chunk identifiers are included in an archive chunk metadata data structure by comparing each of the corresponding chunk identifiers to chunk identifiers included in the archive chunk metadata data structure.

The file system manager may identify one or more corresponding chunk identifiers that are included in the archive chunk metadata data structure. The chunk identifiers included in the archive chunk metadata data structure indicate data chunks associated with the storage tenant that are already stored in a first performance storage class of a cloud storage. In some embodiments, portions of the second archive content were already stored in the first performance storage class of the cloud storage during a first archive of the source storage. If the client-side component were to write to the first performance storage class data chunk corresponding to chunk identifiers already included in the archive chunk metadata data structure, then the cloud storage would store duplicate copies of the same data chunks, which is an inefficient use of the cloud storage. Instead, the file system manager generates, as described herein, metadata for the second archive that references chunk objects storing data chunks included in the portion of content of the second archive. This enables an object included in the second archive to be accessed or restored without storing duplicate copies of the same data chunks.

The file system manager identifies one or more corresponding chunk identifiers that are not included in the archive chunk metadata structure. The file system manager is configured to provide to the client-side component a data structure that indicates one or more data chunks corresponding to the one or more identified chunk identifiers are to be stored to a first performance storage class of the cloud storage, an encryption key, and a reference to a portion of a cloud storage where the one or more data chunks corresponding to the one or more identified chunk identifiers are to be stored. In response, the client-side component completes the subsequent archive in a similar manner as described for step 204. An archive manager may subsequently generate an archive metadata object and one or more tree metadata objects for the second archive and store the generated objects at cloud storage.

At 256, an indication that a client-side component stored one or more data chunks associated with the subsequent archive at the remote storage is received. For each received portion of content, the client-side component is configured to provide the file system manager an indication that the one or more data chunks corresponding to the one or more identified chunk identifiers were written to the provided reference location. In response, the file system manager is configured to generate metadata (e.g., tree data structure, archive chunk metadata data structure, chunk object metadata data structure) that enables the one or more written data chunks to be located at the cloud storage. After the subsequent archive is complete, the generated metadata provides a view (partial or complete) of the source storage at the first point in time. An archive manager may subsequently generate an archive metadata object and one or more tree metadata objects for the subsequent archive and store the generated objects at cloud storage.

At 258, a tree data structure associated with the subsequent archive is generated. A tree data structure that enables the data chunks associated with the archived data of the source system to be located at the remote storage.

At 260, the tree data structure is archived to the remote storage. The archive manager serializes the tree data structure into one or more tree metadata objects and stores the one or more tree metadata objects at the remote storage. Each of the one or more tree metadata objects is associated with a corresponding minimum child retention time.

At 262, a corresponding minimum expiration time associated with the subsequent archive is stored in the tree data structure nodes. The archive manager performs a post order traversal of the tree data structure associated with the subsequent archive in part by storing in each leaf node a corresponding minimum expiration time that indicates a minimum expiration time of the one or more archived objects to which the leaf node references. Data associated with the subsequent archive may be deduplicated against previously stored data. The minimum expiration time stored in a leaf node is based on a minimum of an expiration time associated with the subsequent archive and the minimum child retention time of a tree metadata object associated with the leaf node. The tree metadata object associated with the leaf node may reference one or more chunk objects having an expiration time that expires before the expiration time associated with the subsequent archive. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node.

At 264, a tree data structure associated with the subsequent archive is traversed. The archive manager subsequently performs a compliance scan by traversing some or all of the tree data structure associated with the subsequent archive to identify one or more leaf nodes associated with one or more archived objects having a corresponding minimum expiration time expiring before an expiration time associated with the subsequent archive. At each node, the archive manager compares the minimum expiration time stored by the node to an expiration time associated with the subsequent archive. In response to a determination that the minimum expiration time stored by a node expires before the expiration time associated with the subsequent archive, the archive manager further traverses the tree data structure from the node to a child node associated with the node unless the node is a leaf node. In response to a determination that the minimum expiration time stored by the node expires does not expire before the expiration time associated with the subsequent archive, the archive manager does not further traverse the tree data structure to any child nodes associated with the node. Instead, the archive manager traverses the tree data structure corresponding to the subsequent archive to a different node that is located on the same hierarchy level of the tree data structure as the node. The archive determines whether there are any more nodes on the same hierarchy level of the tree data structure. In response to a determination that there is at least one other node that is located on the same hierarchy level of the tree data structure as the node to inspect, the archive manager traverses to that node. In response to a determination that there are no more nodes that are located on the same hierarchy level of the tree data structure as the node to inspect, the traversal of the tree data structure corresponding to the subsequent archive ends.

At 266, the corresponding expiration time of one or more non-compliant archived objects is updated. For a leaf node storing a corresponding minimum expiration time that expires before the expiration time associated with the subsequent archive, the archive manager inspects the corresponding expiration times of the one or more archived objects to which the leaf node is associated. The archive manager identifies the one or more non-compliant archived objects having a corresponding expiration time that expires before the expiration time associated with the subsequent archive and updates the corresponding expiration time to be complaint with a data management policy associated with the subsequent archive (e.g., to be the expiration time associated with the subsequent archive).

Figure 3A:
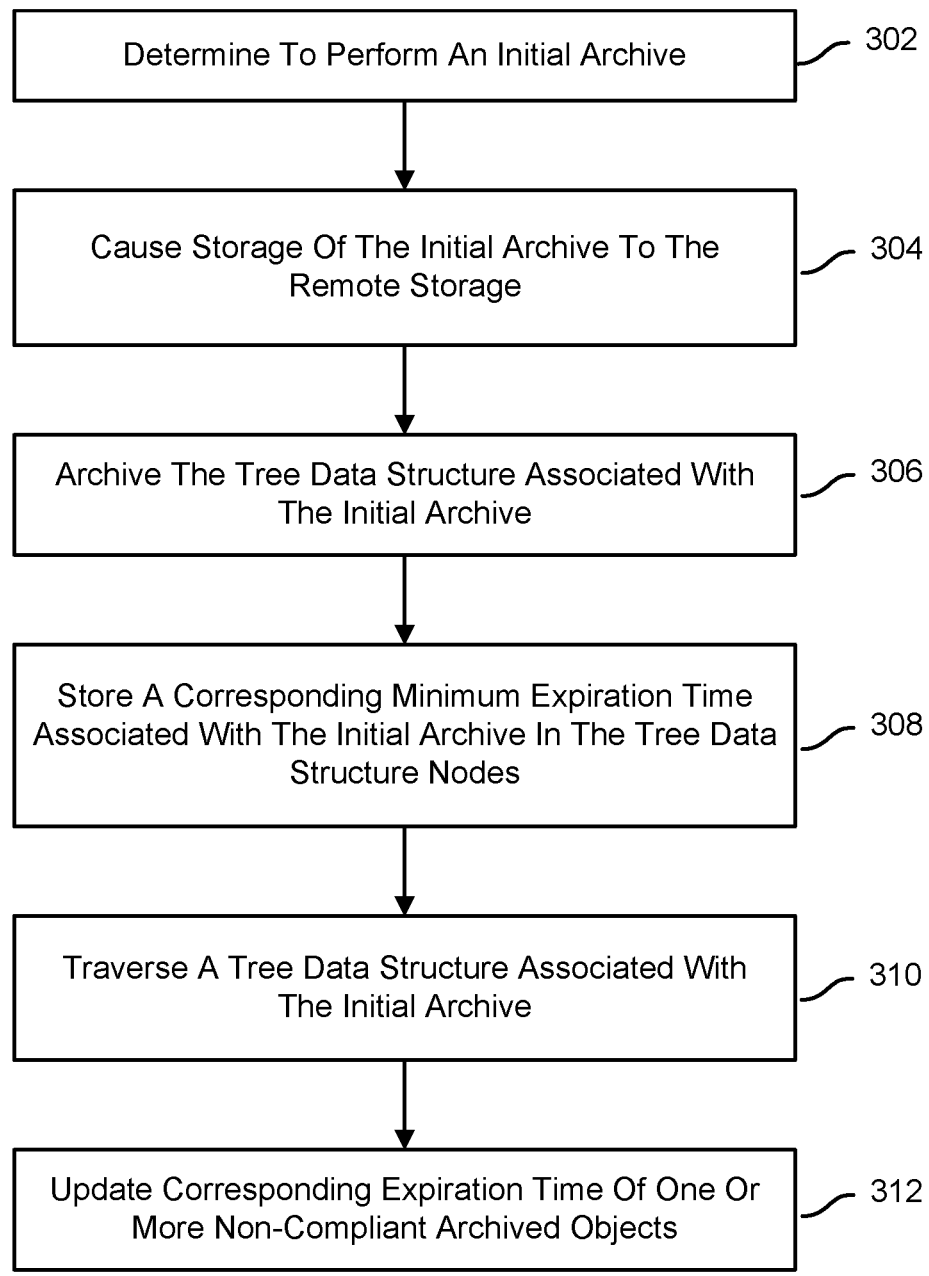
FIG. 3A is a flow diagram illustrating a process for managing expiration times of archived objects in accordance with some embodiments.

FIG. 3A is a flow diagram illustrating a process for managing expiration times of archived objects in accordance with some embodiments. In the example shown, process 300 may be implemented by an archive manager, such as archive manager 169.

At 302, an initial archive is determined to be performed. An archive manager of a storage system may determine that a condition associated with the archive policy has been satisfied. In some embodiments, the initial archive is a full archive of a backup snapshot of the source storage and its associated metadata (e.g., tree data structure). In some embodiments, the initial archive is a full archive of an object included in a backup snapshot of the source storage.

At 304, an initial archive of the backup snapshot is caused to be stored to a remote storage. The archive manager may determine and traverse a tree data structure associated with the initial archive to locate the data chunks associated with the initial archive and send a copy of the data chunks associated with the initial archive to the remote storage. The data chunks associated with the initial archive are stored in one or more chunk objects.

The initial archive is comprised of one or more archived objects. A corresponding expiration time may be established for each of the one or more archived objects. The corresponding expiration time for each of the one or more archived objects associated with the initial archive is established to be an expiration time associated with the initial archive.

At 306, the tree data structure is archived to the remote storage. The archive manager serializes the tree data structure into one or more tree metadata objects and stores the one or more tree metadata objects at the remote storage. Each of the one or more tree metadata objects is associated with a corresponding minimum child retention time. The archive manager may also generate and store at the remote storage an archive metadata object for the initial archive. The archive metadata object associated with the initial archive indicates an expiration time associated with the initial archive.

At 308, a corresponding minimum expiration time associated with the initial archive is stored in the tree data structure nodes. Step 308 may be performed in a similar manner as described in step 212. In some embodiments, process 300 ends in the event the remote storage does not store any other data besides data associated with the initial archive.

At 310, a tree data structure associated with the initial archive is traversed. Step 310 may be performed in a similar manner as described in step 214.

At 312, a corresponding expiration time of one or more non-compliant archived objects is updated. Step 310 may be performed in a similar manner as described in step 216.

Figure 3B:
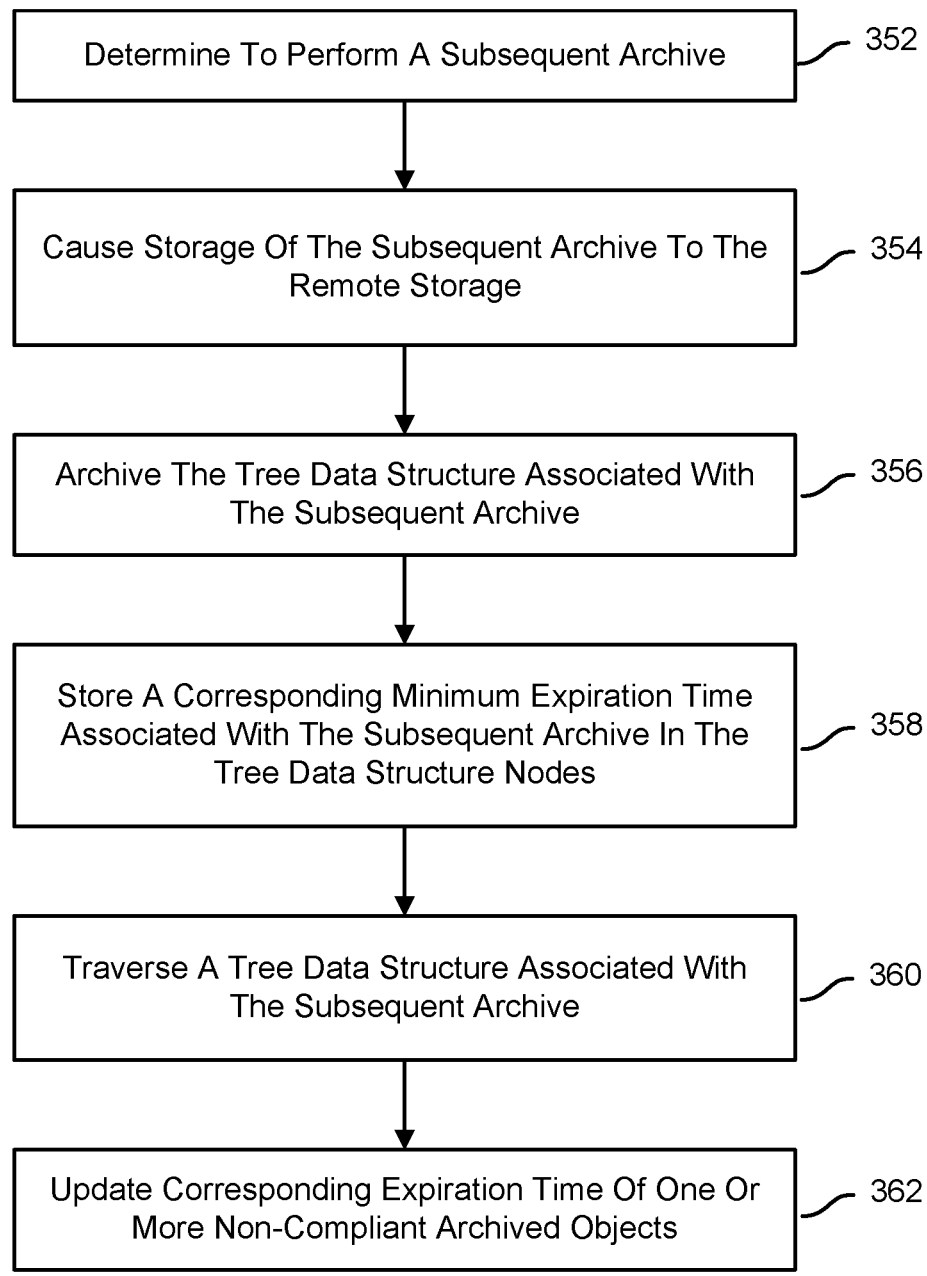
FIG. 3B is a flow diagram illustrating a process for managing expiration times of archived objects in accordance with some embodiments.

FIG. 3B is a flow diagram illustrating a process for managing expiration times of archived objects in accordance with some embodiments. In the example shown, process 350 may be implemented by an archive manager, such as archive managers 169.

At 352, a subsequent archive is determined to be performed. An archive manager of a storage system may determine that one or more conditions associated with an archive policy has been satisfied. The one or more conditions may include a certain amount of time passing since a previous archive, a threshold amount of data being changed since a previous backup snapshot, in response to a user command, a threshold number of incremental backup snapshots being performed since a previous archive, a frequency at which an object is modified within a particular time period, legal compliance, etc.

The subsequent archive may be an incremental archive of a subsequent backup snapshot of the source storage, that is, the incremental archive of the subsequent backup snapshot of the source storage includes data that was not archived in a previous archive of the backup snapshot of the source storage. In some embodiments, the subsequent archive is an incremental archive of an object included in the second snapshot of the source storage.

At 354, the subsequent archive is caused to be stored to a remote storage. The archive manager may determine a tree data structure associated with the subsequent archive. A storage system may store a plurality of backup snapshots associated with a source system. For each of the backup snapshots, the storage system generated a corresponding tree data structure that is comprised of a snapshot tree and one or more metadata structures. The plurality of tree data structures may be linked such that one or more nodes associated with a tree data structure corresponding to a subsequent backup snapshot may reference one or more nodes associated with one or more tree data structures corresponding to one or more previous backup snapshots. Each tree data structure is associated with a view identifier. An archive manager determines the tree data structure having the view identifier.

The archive manager traverses a tree data structure associated with the subsequent archive to locate the data chunks associated with the subsequent archive and send a copy of the data chunks associated with the subsequent archive to the remote storage. The data chunks associated with the subsequent archive are stored in one or more chunk objects.

The subsequent archive is comprised of one or more archived objects. A corresponding expiration time may be established for each of the one or more archived objects. The corresponding expiration time for each of the one or more archived objects associated with the subsequent archive is established to be an expiration time associated with the subsequent archive.

At 356, the tree data structure associated with the subsequent archive is archived. Step 356 may be performed in a similar manner as described in step 260.

At 358, a corresponding minimum expiration time associated with the subsequent archive is stored in the tree data structure nodes. Step 358 may be performed in a similar manner as described in step 262.

At 360, a tree data structure associated with the subsequent archive is traversed. Step 360 may be performed in a similar manner as described in step 264.

At 362, the corresponding expiration time for one or more non-compliant archived objects is updated. Step 362 may be performed in a similar manner as described in step 266.

Figure 4A:
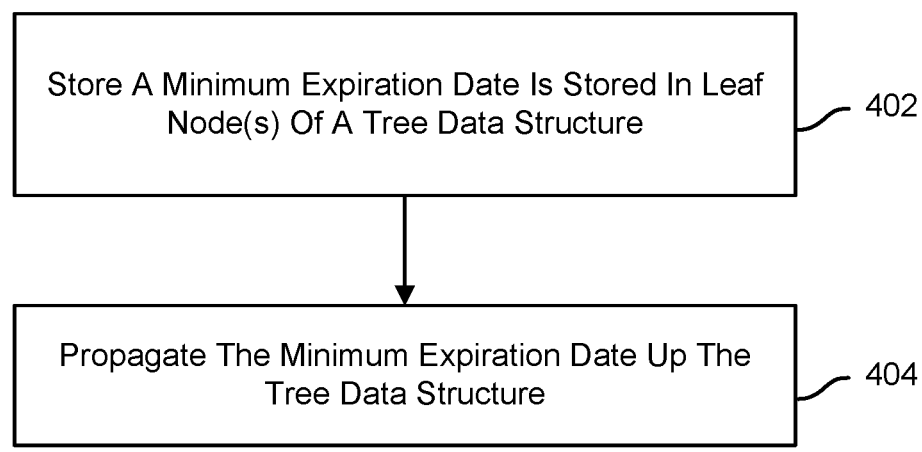
FIG. 4A is a flow diagram illustrating a process for storing an expiration time associated with an archive in accordance with some embodiments.

FIG. 4A is a flow diagram illustrating a process of storing an expiration time associated with an archive in accordance with some embodiments. In the example shown, process 400 may be implemented by an archive manager, such as archive manager 118, 169. In some embodiments, process 400 is implemented to perform some or all of steps 212, 262, 308, 358 of processes 200, 250, 300, 350, respectively.

At 402, a minimum expiration time is stored in leaf node(s)s associated with a tree data structure. In some embodiments, a remote storage does not store any other data besides data associated with the initial archive. In such embodiments, the minimum expiration time stored by a leaf node is the expiration time associated with the initial archive.

In some embodiments, the remote storage already stores data from other sources and data associated with the initial archive is deduplicated against the previously stored data. In such embodiments, the minimum expiration time stored in a leaf node is based on a minimum of an expiration time associated with the initial archive and the minimum child retention time of a tree metadata object associated with the leaf node. The minimum child retention time is the minimum expiration time of an archived object to which the tree metadata object associated with the leaf node references. The tree metadata object associated with the leaf node may reference one or more chunk objects associated with one or more archived objects having an expiration time that expires before the expiration time associated with the initial archive. The tree metadata object associated with the leaf node may reference one or more chunk objects having an expiration time that expires before the expiration time associated with the initial archive.

At 404, the expiration time associated with the archive is propagated up the tree data structure. At each node above a leaf node level, the storage system compares the corresponding minimum expiration times of the child nodes associated with the node and stores the minimum of the corresponding minimum expiration times as the minimum expiration time for the node. This indicates that archived objects indirectly referenced by the node will be stored at the remote storage until at least the minimum expiration time stored by the node.

Figure 4B:
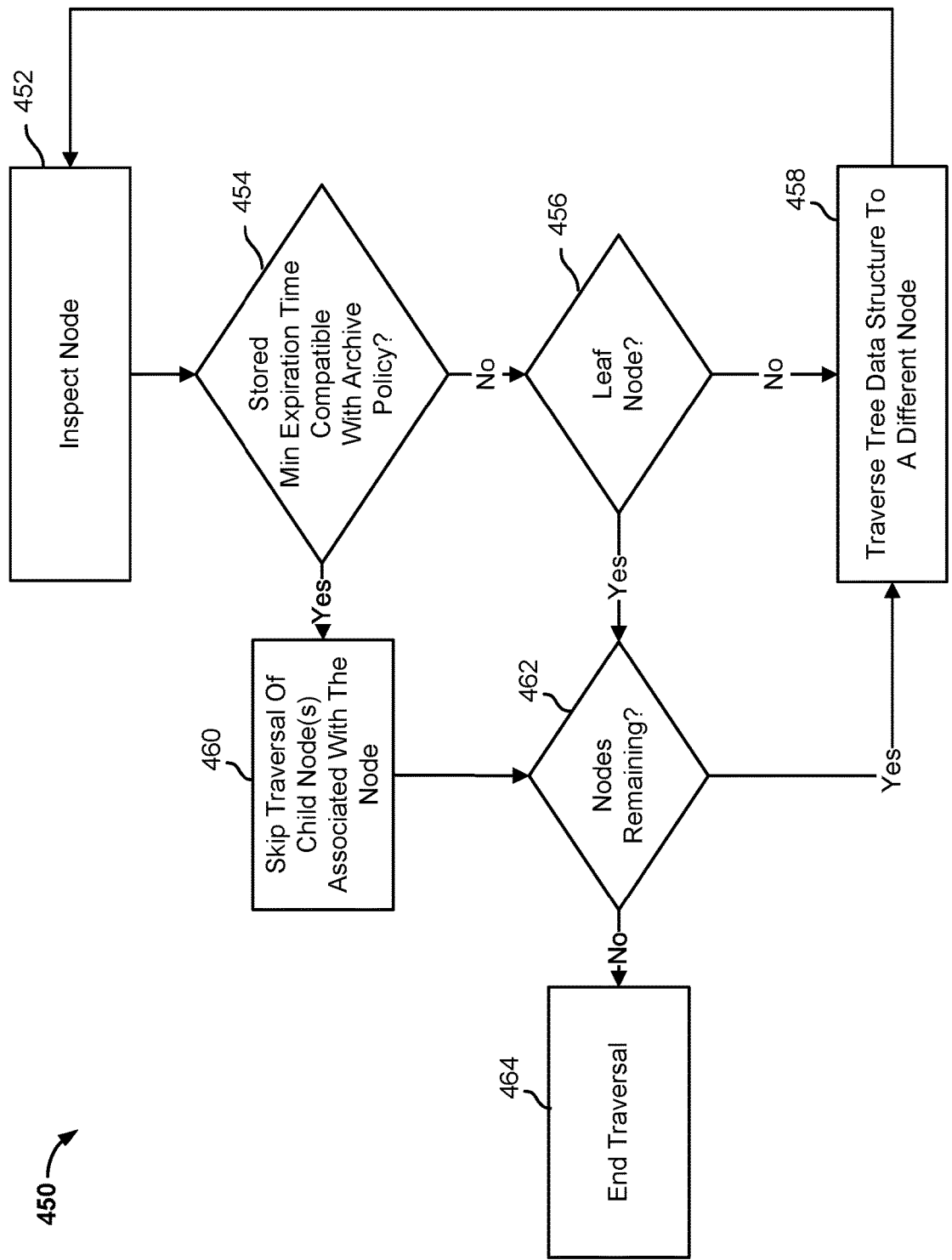
FIG. 4B is a flow diagram illustrating a process for performing a compliance scan in accordance with some embodiments.

FIG. 4B is a flow diagram illustrating a process for performing a compliance scan in accordance with some embodiments. In the example shown, process 450 may be implemented by an archive manager, such as archive manager 118, 169. In some embodiments, process 450 is implemented to perform some or all of steps 214, 264, 310, 360 of processes 200, 250, 300, 350, respectively.

At 452, a node of a tree data structure is inspected. The node of the tree data structure stores a minimum expiration time.

At 454, it is determined whether the stored minimum expiration time is compatible with an expiration time associated with an archive. A stored minimum expiration time is compatible with an expiration time associated with the archive in the event the stored minimum expiration time expires does not expire before the expiration time associated with the archive.

In the event it is determined that the stored minimum expiration time is compatible with the expiration time associated with the archive, process proceeds to 460. In the event it is determined that the stored minimum expiration time is not compatible with the expiration time associated with the archive, process 450 proceeds to 456.

At 456, it is determined whether the node is a leaf node. In the event the node is a leaf node, process 450 proceeds to 462. In the event it is determined that the node is not a leaf node, process 450 proceeds to 458.

At 458, the tree data structure is traversed to a different node. In some embodiments, the different node is a child node. In some embodiments, the different node is located on the same hierarchy level of the tree data structure as the node. Subsequently, process 450 returns to 452.

At 460, a traversal of one or more child nodes associated with the node is skipped. This reduces the amount of time and resources needed to update corresponding expiration times for the one or more archived objects referenced by the subsequent archive to the expiration time associated with the subsequent archive because the child nodes associated with the node do not need to be traversed.

At 462, it is determined whether there are any more nodes of the tree data structure to traverse. In the event there are no more nodes to traverse, process 450 proceeds to 464 and the traversal ends. In the event there are more nodes to traverse, process 450 proceeds to 458.

Figure 5A:
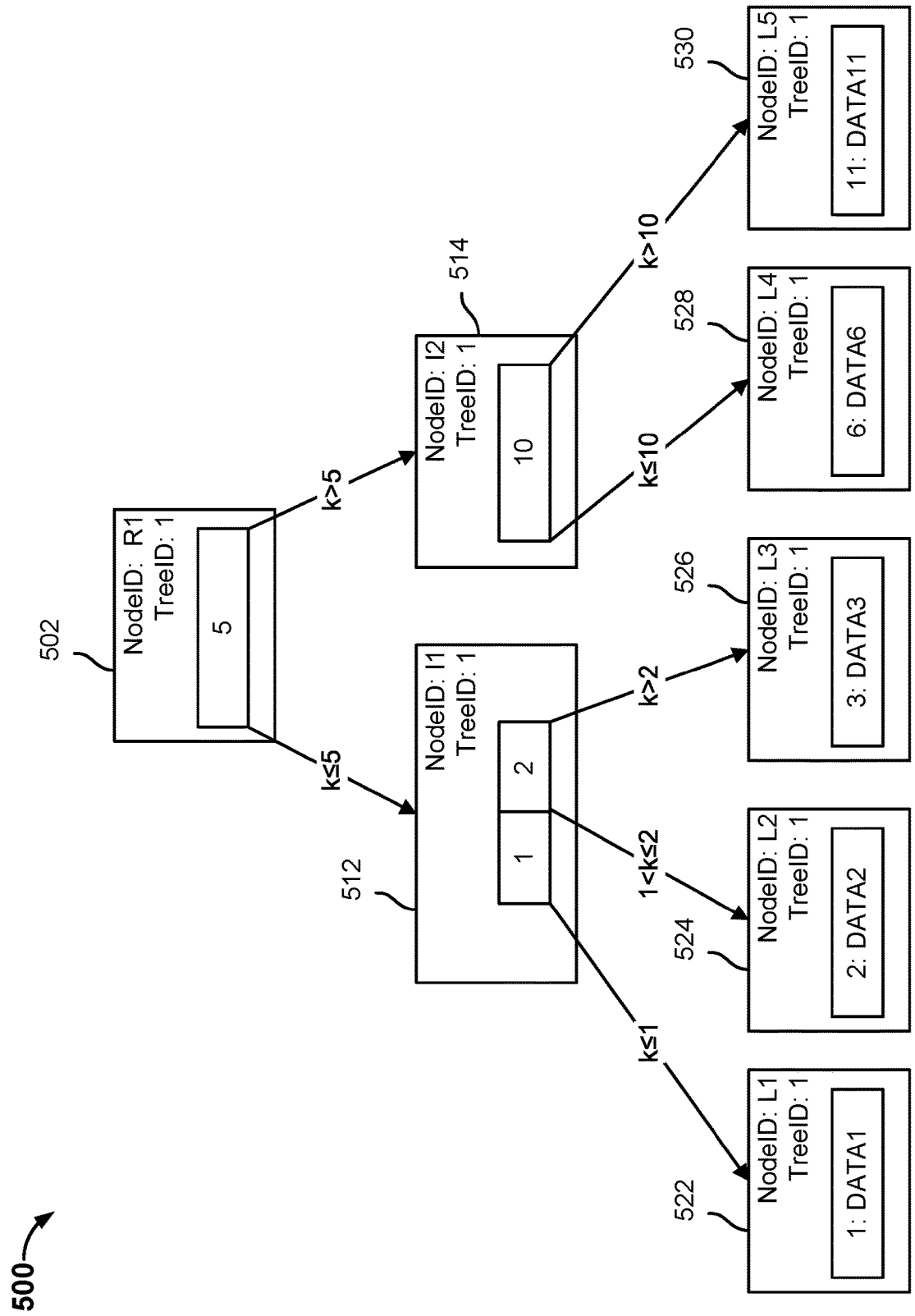
FIG. 5A is a block diagram illustrating an embodiment of a tree data structure.

FIG. 5A is a block diagram illustrating an embodiment of a tree data structure. A tree data structure may be used to represent a view of file system data that is stored on a storage system, such as storage system 105. A tree data structure may be used to represent a view of file system data that is archived to cloud storage, such as cloud storage 122. The file system data may include metadata for a distributed file system and may include information, such as chunk identifier, chunk offset, file size, directory structure, file permissions, physical storage locations of the content files, etc. A file system manager, such as file system managers 115, 167, may generate tree data structure 500 in response to ingesting data from a source system. Tree data structure 500 may correspond to a full backup of a source system. Tree data structure 500 may correspond to a replica of the file system data stored on the source system. Tree data structure 500 may correspond to some or all of the file system data stored on the source system that is tiered to the storage system.

Tree data structure 500 is comprised of a snapshot tree that includes root node 502, intermediate nodes 512, 514, and leaf nodes 522, 524, 526, 528, 530. Although tree data structure 500 includes one intermediate level between root node 502 and leaf nodes 522, 524, 526, 528, 530, any number of intermediate levels may be implemented. Tree data structure 500 may correspond to a performance of a data management operation (e.g., backup, migration, replication, tiering, etc.) at a particular point in time, for example, at time t0. The snapshot tree in conjunction with a plurality of object metadata structures may provide a complete view of the source system associated with performing a data management operation for the particular point in time.

A root node is the starting point of a snapshot tree and may include pointers to a plurality of other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 522. The data key k may correspond to a brick number of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with a content file when the data is less than or equal to a limit size (e.g., 256 kB). In some embodiments, a leaf node includes a pointer to an object metadata structure (e.g., blob structure) when the size of data associated with a content file, object, or object file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 502 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 502 would be traversed to intermediate node 512 because the data keys of "1," "2," and "3" are less than or equal to the node key "5." To find a leaf node storing a value associated with a data key of "6" or "11," the second branch of root node 502 would be traversed to intermediate node 514 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 502 includes pointers to intermediate node 512 and intermediate node 514. Root node 502 includes a NodeID of "R1" and a TreeID of "1."

The NodeID identifies the name of the node. The TreeID identifies the view with which the node is associated. When a change is made to data stored in a leaf node as described with respect to FIGS. 5B, 5C, and 5D, the TreeID is used to determine whether a copy of a node is to be made.

Root node 502 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 500 from root node 502 to intermediate node 512 because the data keys have a value that is less than or equal to the node key. Leaf nodes with a data key of "6" or "11" may be found by traversing tree data structure 500 from root node 502 to intermediate node 514 because the data keys have a value that is greater than the node key.

Root node 502 includes a first set of pointers. The first set of pointers associated with a data key less than or equal to the node key (e.g., "1", "2," or "3") indicates that traversing tree data structure 500 from root node 502 to intermediate node 512 will lead to a leaf node with a data key of "1," "2," or "3." Intermediate node 514 includes a second set of pointers. The second set of pointers associated with a data key greater than the node key indicates that traversing tree data structure 500 from root node 502 to intermediate node 514 will lead to a leaf node with a data key of "6" or "11."

Intermediate node 512 includes pointers to leaf nodes 522, 524, 526. Intermediate node 512 includes a NodeID of "I1" and a TreeID of "1." Intermediate node 512 includes a first node key of "1" and a second node key of "2." The data key k for leaf node 522 is a value that is less than or equal to the first node key. The data key k for leaf node 524 is a value that is greater than the first node key and less than or equal to the second node key. The data key k for leaf node 526 is a value that is greater than the second node key. The pointer to leaf node 522 indicates that traversing tree data structure 500 from intermediate node 512 to leaf node 522 will lead to the node with a data key of "1." The pointer to leaf node 524 indicates that traversing tree data structure 500 from intermediate node 512 to leaf node 524 will lead to the node with a data key of "2." The pointer to leaf node 526 indicates that traversing tree data structure 500 from intermediate node 512 to leaf node 526 will lead to the node with a data key of "3."

Intermediate node 514 includes pointers to leaf nodes 528, 530. Intermediate node 514 includes a NodeID of "I2" and a TreeID of "1." Intermediate node 514 includes a node key of "10." The data key k for leaf node 528 is a value that is less than or equal to the node key. The data key k for leaf node 530 is a value that is greater than the node key. The pointer to leaf node 528 indicates that traversing tree data structure 500 from intermediate node 514 to leaf node 528 will lead to the node with a data key of "6." The pointer to leaf node 530 indicates that traversing tree data structure 500 from intermediate node 514 to leaf node 530 will lead to the node with a data key of "11."

Leaf nodes 522, 524, 526, 528, 530 include respective data key-value pairs of "1: DATA1," "2: DATA2," "3: DATA3," "6: DATA6," "11: DATA11." Leaf nodes 522, 524, 526, 528, 530 include respective Node IDs of "L1," "L2," "L3," "L4," "L5." Leaf nodes 522, 524, 526, 528, 530 all include a TreeID of "1." In some embodiments, leaf nodes 522, 524, 526, 528, or 530 are configured to store metadata. In other embodiments, leaf nodes 522, 524, 526, 528, or 530 are configured to store content data when the size of the content file is less than or equal to a limit size. In other embodiments, leaf nodes 522, 524, 526, 528, or 530 are inodes and are configured to store a pointer to or an identifier of a respective object metadata structure (e.g., object metadata tree).

Figure 5B:
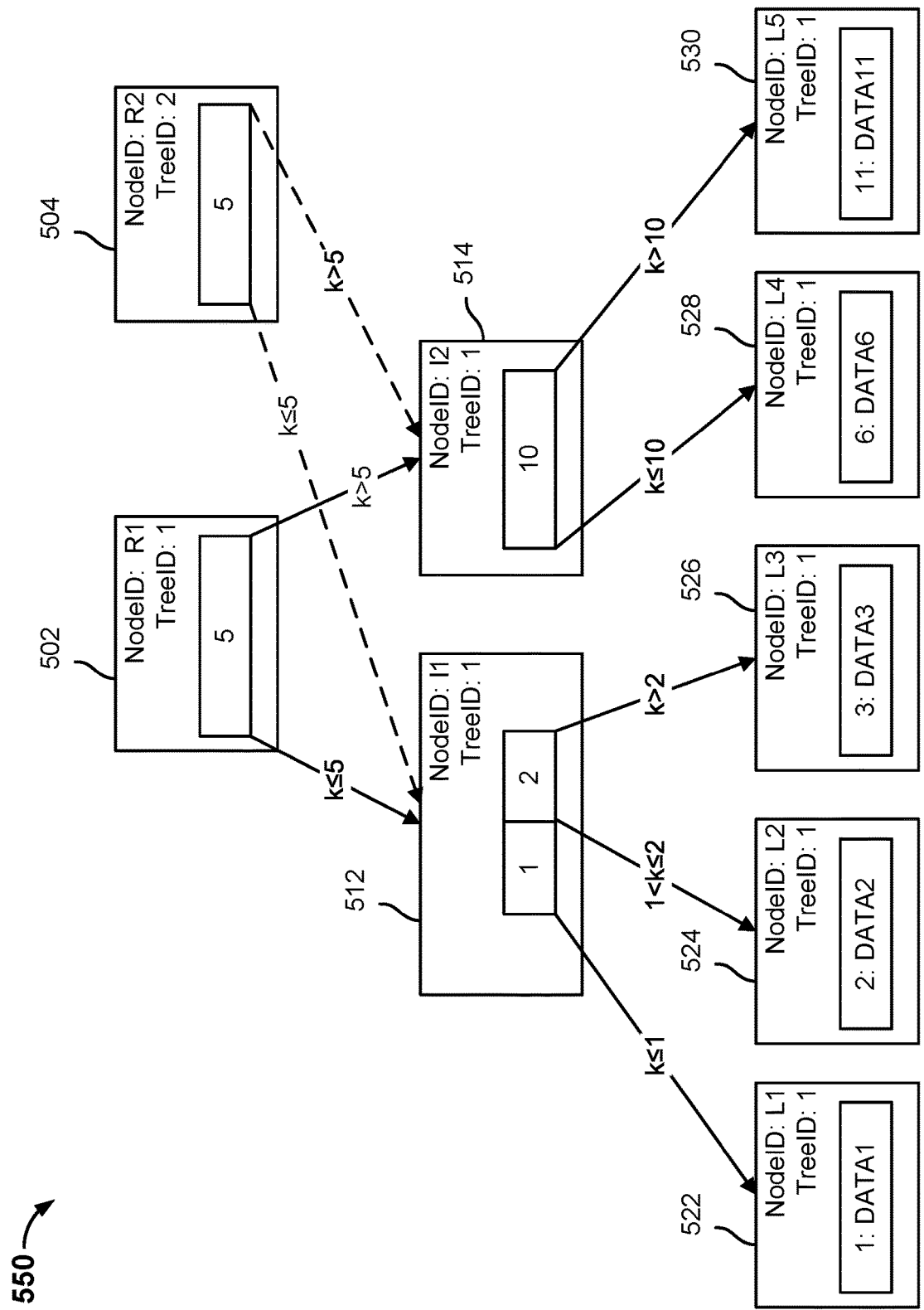
FIG. 5B is a block diagram illustrating an embodiment of a cloned tree data structure.

FIG. 5B is a block diagram illustrating an embodiment of a cloned tree data structure. A snapshot tree may be cloned when a snapshot tree is added to a tree data structure, when data associated with a snapshot tree is migrated, when data associated with a snapshot tree is restored, when data associated with a snapshot tree is replicated, when data associated with a snapshot tree is used for test/development purposes, etc. In some embodiments, tree data structure 550 may be created by a storage system, such as storage system 105 or a cloud server, such as cloud server 113.

A subsequent data management operation may be performed. For example, an incremental backup of a source system, such as source system 102, may be performed. The manner in which the file system data is associated with the subsequent data management operation may be represented by a tree data structure. The tree data structure corresponding to the subsequent data management operation is generated in part by cloning a snapshot tree associated with a performance of a previous data management operation.

In the example shown, tree data structure 550 includes root nodes 502, 504, intermediate nodes 512, 514, and leaf nodes 522, 524, 526, 528, and 530. Tree data structure 550 can be used to capture different versions of file system data at different moments in time. A tree data structure may also efficiently locate desired metadata by traversing a particular version of a snapshot tree included in the tree data structure. In some embodiments, the tree data structure allows a chain of data management operation performances to be linked together by allowing a node of a later version of a snapshot tree to reference a node of a previous version of a snapshot tree. For example, a snapshot tree with root node 504 is linked to a snapshot tree with root node 502. Each time a data management operation is performed, a new root node may be created and the new root node includes the same set of pointers included in the previous root node, that is the new root node of the snapshot tree may be linked to one or more intermediate nodes associated with a previous snapshot tree. The new root node also includes a different NodeID and a different TreeID.

In some embodiments, a root node is associated with a current view of the file system data. A current view may still accept one or more changes to the data. In the example shown, root node 504 is associated with a current view of the file system data. In other embodiments, a root node is associated with a snapshot view of the file system data. A snapshot view may represent a state of the file system data at a particular moment in time in the past and is not updated. In the example shown, root node 502 is associated with a snapshot view of the file system data.

To generate a snapshot tree corresponding to a subsequent performance of a data management operation instance at $t_1$, root node 502 is cloned, i.e., copied. In the example shown, root node 504 is a copy of root node 502. Similar to root node 502, root node 504 includes the same pointers as root node 502, but includes a different NodeID and a different TreeID. Root node 504 includes a first set of pointers to intermediate node 512. The first set of pointers associated with a data key k less than or equal to the node key (e.g., "1," "2," or "3") indicates that traversing tree data structure 550 from root node 504 to intermediate node 512 will lead to a leaf node with a data key of "1," "2," or "3." Root node 504 includes a second set of pointers to intermediate node 514.

The second set of pointers associated with a data key k greater than the node key indicates that traversing tree data structure 550 from root node 504 to intermediate node 514 will lead to a leaf node with a data key of "6" or "11." Root node 504 includes a NodeID of "R2" and a TreeID of "2."

Figure 5C:
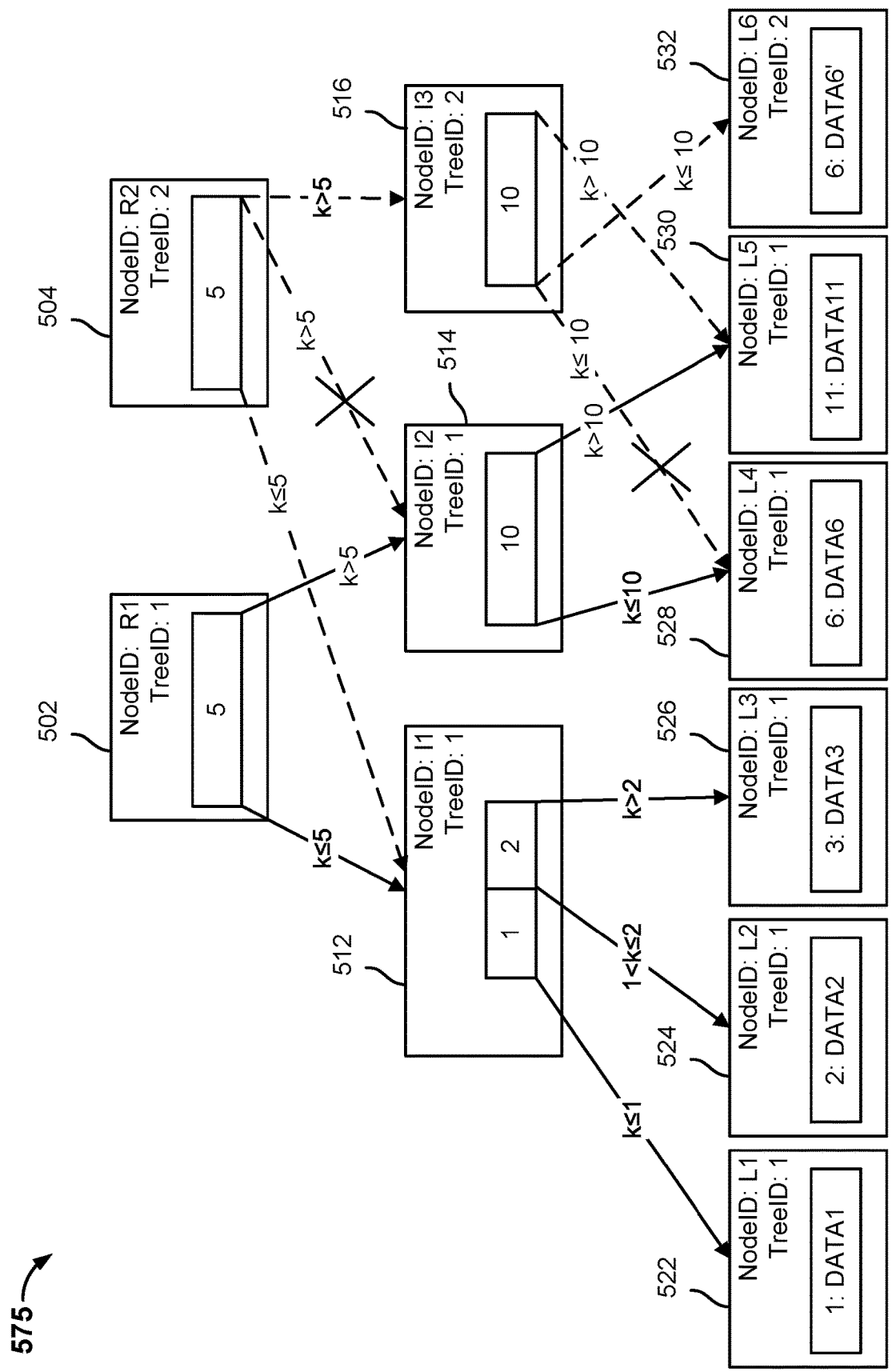
FIG. 5C is a block diagram illustrating an embodiment of modifying a cloned tree data structure.

FIG. 5C is a block diagram illustrating an embodiment of modifying a cloned tree data structure. In the example shown, tree data structure 575 may be modified by a file system manager, such as file system managers 115, 167. A snapshot tree with a root node 504 may be a current view of the file system data, for example, at time $t_1$.

In the example shown, the value "DATA6" has been modified to be "DATA6'." In some embodiments, the value of a key value pair has been modified. In other embodiments, the value of the key value pair is the file data of associated with a content file that is smaller than or equal to a limit size. In other embodiments, the value of the key value pair points to a different object metadata structure (e.g., an object metadata structure corresponding to a different version of a file). The different object metadata structure may be a modified version of the object metadata structure to which the leaf node previously pointed.

To modify the snapshot tree at $t_1$, the file system manager starts at root node 504 because that is the root node associated with the snapshot tree at time $t_1$. The value "DATA6" is associated with the data key "6." The file system manager traverses tree data structure 575 from root node 504 until it reaches a target node, in this example, leaf node 528. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 504 and proceeds to intermediate node 514. The file system manager compares the TreeID of intermediate node 514 with the TreeID of root node 504, determines that the TreeID of intermediate node 514 does not match the TreeID of root node 504, and creates a copy of intermediate node 514. The intermediate node copy 516 includes the same set of pointers as intermediate node 514, but includes a TreeID of "2" to match the TreeID of root node 504. The file system manager updates a pointer of root node 504 to point to intermediate node 516 instead of pointing to intermediate node 514. The file system manager traverses tree data structure 575 from intermediate node 516 to leaf node 528, determines that the TreeID of leaf node 528 does not match the TreeID of root node 504, and creates a copy of leaf node 528. Leaf node copy 532 stores the modified value "DATA6'" and includes the same TreeID as root node 504. The file system manager updates a pointer of intermediate node 516 to point to leaf node 532 instead of pointing to leaf node 528. In some embodiments, leaf node 532 stores the value of a key value pair that has been modified. In other embodiments, leaf node 532 stores the modified data associated with a content file that is smaller than or equal to a limit size.

Figure 5D:
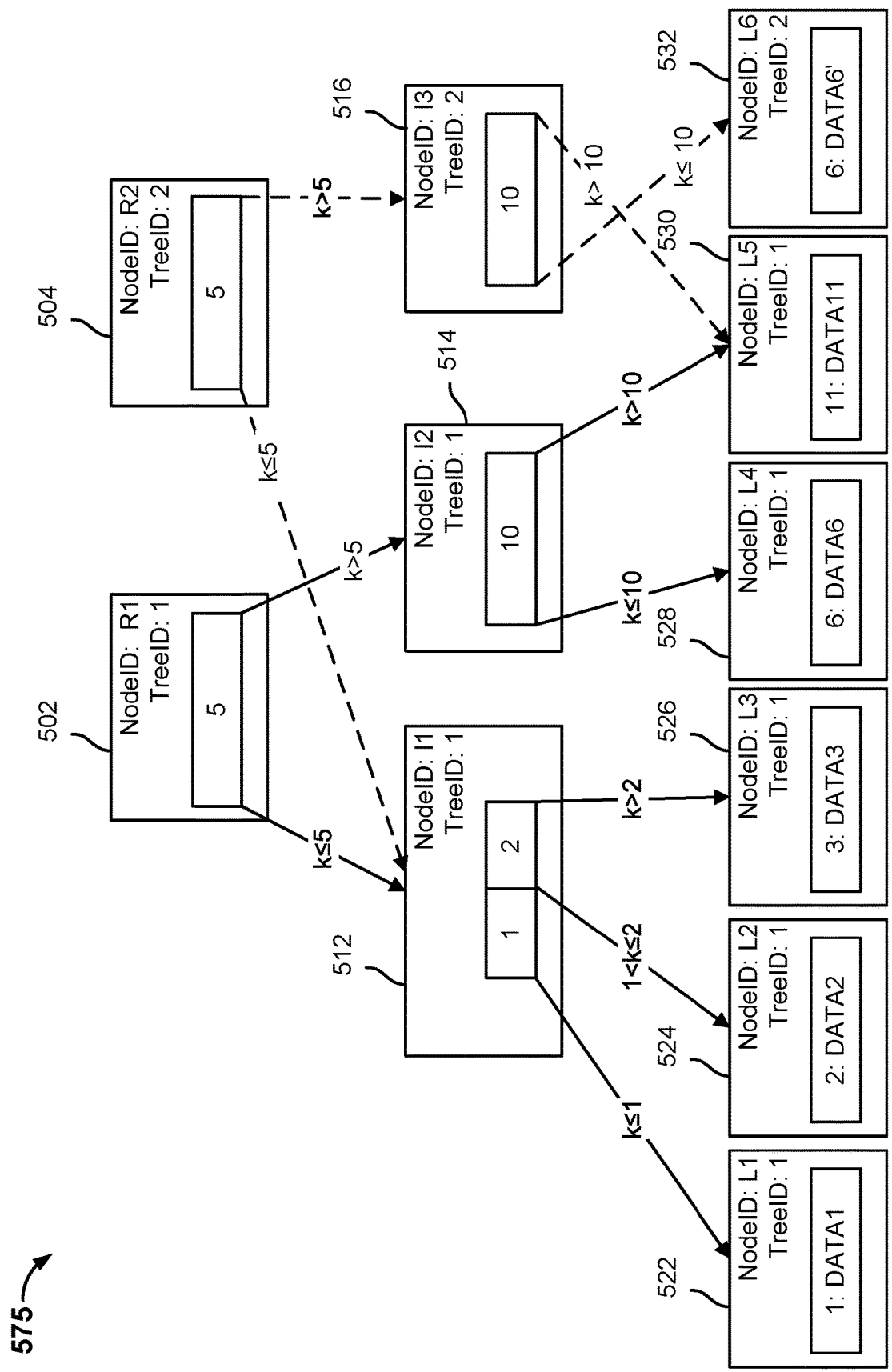
FIG. 5D is a block diagram illustrating an embodiment of a modified tree data structure.

FIG. 5D is a block diagram illustrating an embodiment of a modified tree data structure. Tree data structure 575 shown in FIG. 5D illustrates a result of the modifications made to a snapshot tree as described with respect to FIG. 5C.

Figure 6A:
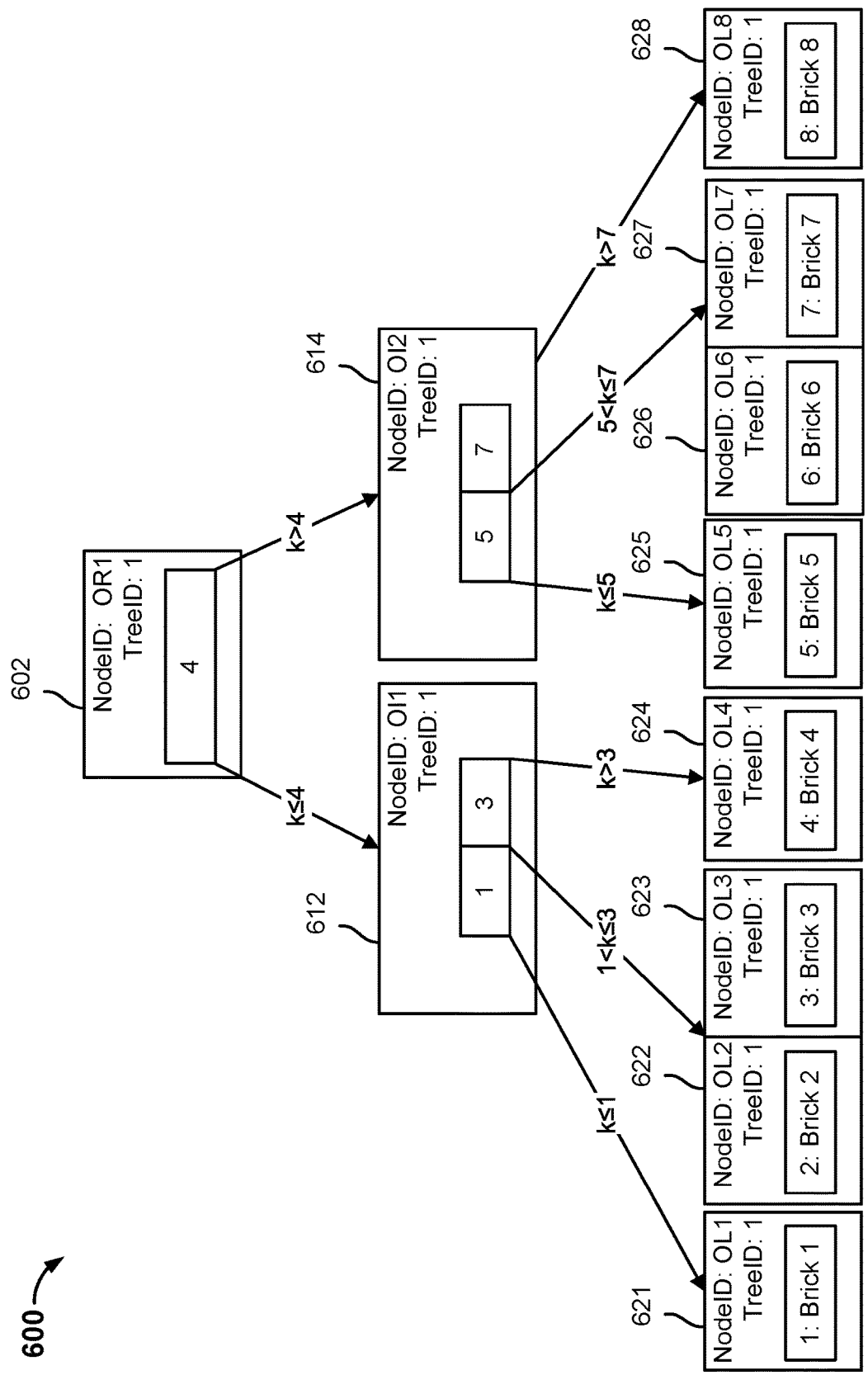
FIG. 6A is a block diagram illustrating an embodiment of a tree data structure.

FIG. 6A is a block diagram illustrating an embodiment of a tree data structure. In some embodiments, tree data structure 600 is created by a storage system, such as storage system 105. In some embodiments, tree data structure 600 is created by a cloud server, such cloud server 113. Tree data structure 600 may be used to store the metadata associated with an object, an object file, or a content file. Tree data structure 600 may be referred to as an object metadata structure, an object file metadata structure, or a file metadata structure. In the example shown, tree data structure 600 corresponds to the contents of an object file.

A leaf node of a snapshot tree associated with file system data, such as a leaf node of tree data structures 500, 550, 575, may include a pointer to a tree data structure that stores metadata corresponding to an object file, such as tree data structure 600. A tree data structure corresponding to an object file and storing the file metadata associated with the object file is a snapshot tree, but is used to enable the data chunks associated with the object file (e.g., data components) to be located.

A tree data structure corresponding to an object at a particular point in time (e.g., a particular version) may be comprised of a root node, one or more levels of one or more intermediate nodes, and one or more leaf nodes. In some embodiments, a tree data structure corresponding to an object is comprised of a root node and one or more leaf nodes without any intermediate nodes. Tree data structure 600 may be a snapshot of an object at a particular point in time t, for example at time to. Tree data structure 600 may correspond to a full backup of the object.

In the example shown, tree data structure 600 includes object root node 602, object intermediate nodes 612, 614, and object leaf nodes 621, 622, 623, 624, 625, 626, 627, 628. Similar to the snapshot trees described above, each node includes a "NodeID" that identifies the node and a "TreeID" that identifies a view with which the node is associated (e.g., a version of the content file). Root node 602 includes pointers to intermediate nodes 612, 614. Root node 602 includes a NodeID of "OR1" and a TreeID of "1."

In the example shown, intermediate node 612 includes respective pointers to leaf nodes 621, 622, 623, 624. Intermediate node 612 includes a NodeID of "OI1" and a TreeID of "1." Intermediate node 612 includes a first node key and a second node key. The data key k for leaf node 621 is a value that is less than or equal to the first node key. The data key for leaf nodes 622, 623 is a value that is greater than the first node key and less than or equal to the second node key. The data key for leaf node 624 is a value that is greater than the second node key. The pointer to leaf node 621 indicates that traversing tree data structure 600 from intermediate node 612 to leaf node 621 will lead to the node with a data key of "1." The pointer to leaf node 622 indicates that traversing tree data structure 600 from intermediate node 612 to leaf node 622 will lead to the node with a data key of "2." The pointer to leaf node 623 indicates that traversing tree data structure 600 from intermediate node 612 to leaf node 623 will lead to the node with a data key of "3." The pointer to leaf node 624 indicates that traversing tree data structure 600 from intermediate node 612 to leaf node 624 will lead to the node with a data key of "4."

In the example shown, intermediate node 614 includes respective pointers to leaf nodes 625, 626, 627, 628. Intermediate node 614 includes a NodeID of "OI2" and a TreeID of "1." Intermediate node 614 includes a first node key and a second node key.

The data key k for leaf node 625 is a value that is less than or equal to the first node key. The data key for leaf nodes 626, 627 is a value that is greater than the first node key and less than or equal to the second node key. The data key for leaf node 628 is a value that is greater than the second node key. The pointer to leaf node 625 indicates that traversing tree data structure 600 from intermediate node 614 to leaf node 625 will lead to the node with a data key of "5." The pointer to leaf node 626 indicates that traversing tree data structure 600 from intermediate node 614 to leaf node 626 will lead to the node with a data key of "6." The pointer to leaf node 627 indicates that traversing tree data structure 600 from intermediate node 614 to leaf node 627 will lead to the node with a data key of "7." The pointer to leaf node 628 indicates that traversing tree data structure 600 from intermediate node 614 to leaf node 628 will lead to the node with a data key of "8."

Leaf node 621 includes a data key-value pair of "1: Brick 1." "Brick 1" is a brick identifier that identifies the data brick associated with one or more data chunks of a content file corresponding to tree data structure 600. Leaf node 621 includes a NodeID of "OL1" and a TreeID of "1."

Leaf node 622 includes a data key-value pair of "2: Brick 2." "Brick 2" is a brick identifier that identifies the data brick associated with one or more data chunks of a content file corresponding to tree data structure 600. Leaf node 622 includes a NodeID of "OL2" and a TreeID of "1." In this example, both leaf nodes 622, 623 have a key value that is less than or equal to 3 and greater than 1. A file system manager may traverse to leaf node 622 or leaf node 623 based on the corresponding key associated with leaf node 622 and leaf node 623. For example, the file system manager may receive a request to return the value associated with a data key "2." In response to the request, the file system manager may traverse tree data structure 600 to leaf node 622. A file system manager may receive a request to return the value associated with a data key "3." In response to the request, the file system manager may traverse tree data structure 600 to leaf node 623.

Leaf node 623 includes a data key-value pair of "3: Brick 3." "Brick 3" is a brick identifier that identifies the data brick associated with one or more data chunks of an object file corresponding to tree data structure 600. Leaf node 623 includes a NodeID of "OL3" and a TreeID of "1."

Leaf node 624 includes a data key-value pair of "4: Brick 4." "Brick 4" is a brick identifier that identifies the data brick associated with one or more data chunks of an object file corresponding to tree data structure 600. Leaf node 624 includes a NodeID of "OL4" and a TreeID of "1."

Leaf node 625 includes a data key-value pair of "5: Brick 5." "Brick 5" is a brick identifier that identifies the data brick associated with one or more data chunks of an object file corresponding to tree data structure 600. Leaf node 625 includes a NodeID of "OL5" and a TreeID of "1."

Leaf node 626 includes a data key-value pair of "6: Brick 6." "Brick 6" is a brick identifier that identifies the data brick associated with one or more data chunks of an object file corresponding to tree data structure 600. Leaf node 626 includes a NodeID of "OL6" and a TreeID of "1." In this example, both leaf nodes 626, 627 have a key value that is less than or equal to 7 and greater than 5. A file system manager may traverse tree data structure 600 to leaf node 626 or leaf node 627 based on the corresponding key associated with leaf node 626 and leaf node 627. For example, the file system manager may receive a request to return the value associated with a data key "6." In response to the request, the file system manager may traverse tree data structure 600 to leaf node 626. The file system manager may receive a request to return the value associated with a data key "7." In response to the request, the file system manager may traverse tree data structure 600 to leaf node 627.

Leaf node 627 includes a data key-value pair of "7: Brick 7." "Brick 7" is a brick identifier that identifies the data brick associated with one or more data chunks of a content file corresponding to tree data structure 600. Leaf node 627 includes a NodeID of "OL7" and a TreeID of "1."

Leaf node 628 includes a data key-value pair of "8: Brick 8." "Brick 8" is a brick identifier that identifies the data brick associated with one or more data chunks of a content file corresponding to tree data structure 600. Leaf node 628 includes a NodeID of "OL8" and a TreeID of "1."

An object file may be comprised of one or more chunk files. A chunk file is comprised of a plurality of data chunks. A brick may be associated with one or more data chunks. In the example shown, leaf nodes 621, 622, 623, 624, 625, 626, 627, 628 each store a corresponding brick identifier. For each of the one or more data chunks associated with a data brick, the data brick stores information that associates an object offset for the data chunk with an extent for the data chunk and a chunk file identifier storing the data chunk.

Figure 6B:
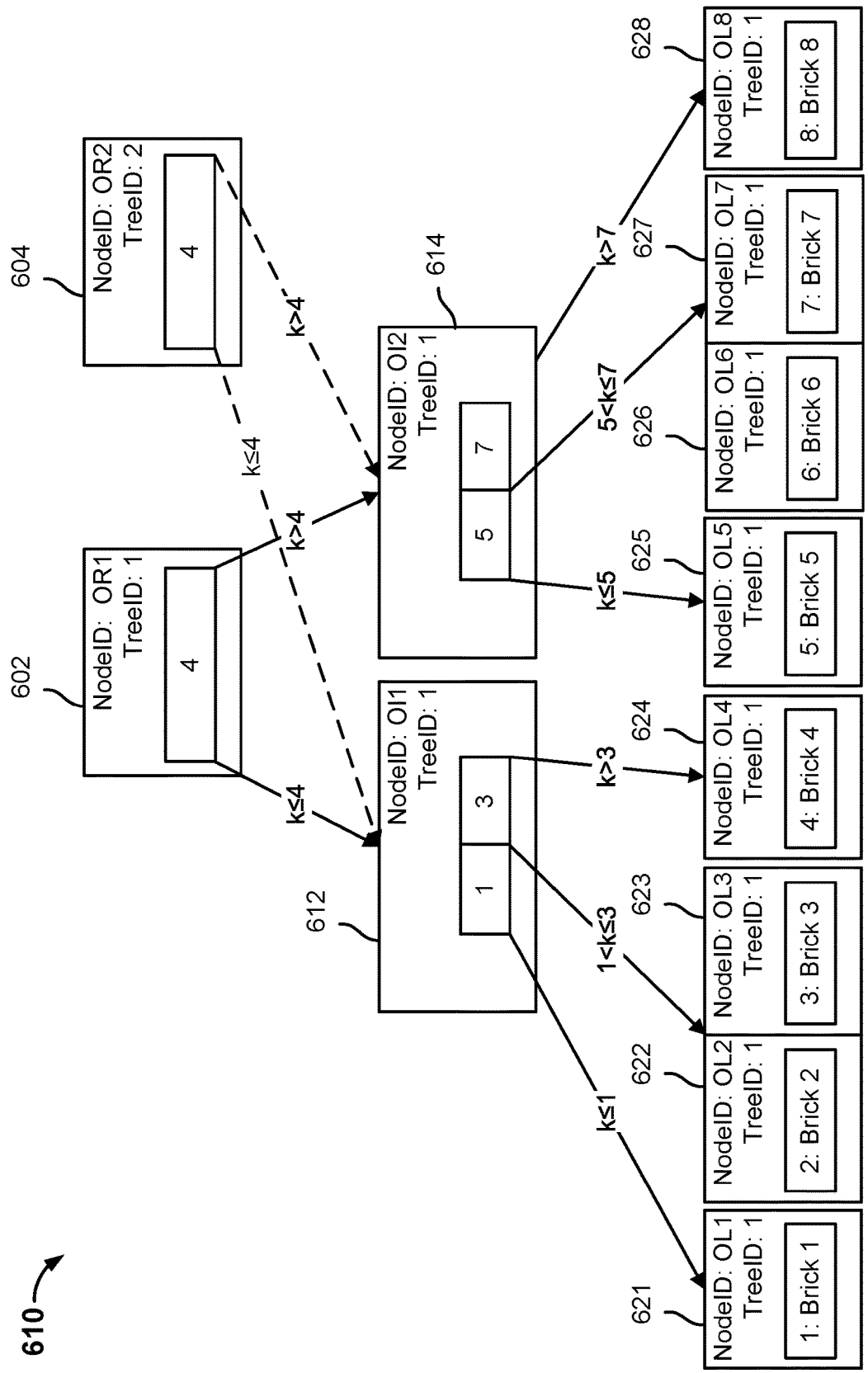
FIG. 6B is a block diagram illustrating an embodiment of a cloned tree data structure.

FIG. 6B is a block diagram illustrating an embodiment of a cloned tree data structure. An object metadata structure may be cloned when a subsequent version of an object, an object file, or a content file is stored on a storage system. In some embodiments, tree data structure 610 is created by a storage system, such as storage system 105. In some embodiments, tree data structure 610 is created by a cloud server, such as cloud server 113. In the example shown, tree data structure 610 corresponds to an object file, but stores metadata associated with the object file. The tree data structure can be used to capture different versions of an object, an object file, or a content file at different moments in time. The object metadata structure corresponding to a subsequent version of an object, an object file, or a content file may be generated in part by cloning the object metadata structure corresponding to a previous version of an object, an object file, or a content file.

A root node or an intermediate node of a version of an object metadata structure may reference an intermediate node or a leaf node of a previous version of an object metadata structure. Similar to the snapshot tree, the object metadata structure allows different versions of an object, an object file, or a content file to share nodes and allows changes to be tracked. When a backup snapshot is received, a root node of the object metadata structure may be linked to one or more intermediate nodes associated with a previous metadata structure. This may occur when data associated with an object, an object file, or a content file is included in performances of multiple data management operations.

In the example shown, tree data structure 610 includes a first metadata structure comprising root node 602, intermediate nodes 612, 614, and leaf nodes 621, 622, 623, 624, 625, 626, 627, 628. Tree data structure 610 also includes a second metadata structure that may be a snapshot of object data at a particular point in time, for example at time $t_1$. The second metadata structure is comprised of root node 604, intermediate nodes 612, 614, and leaf nodes 621, 622, 623, 624, 625, 626, 627, 628. To create a snapshot of the object data at time $t_1$, a new root node is created by cloning the previous root node. The cloned root node includes the same set of pointers as the previous root node, but includes a different NodeID and a different TreeID. In the example shown, root node 604 includes a set of pointers to intermediate nodes 612, 614, which are intermediate nodes associated with a previous snapshot. The TreeID is the view identifier associated with a view of the object metadata structure at a particular moment in time. The TreeID of a root node indicates a view with which the root node is associated (e.g., content file version). For example, root node 602 with a TreeID of "1" is associated with a first backup snapshot and root node 604 with a TreeID of "2" is associated with a second backup snapshot.

In the example shown, root node 604 is a clone (i.e., a copy) of root node 602. Similar to root node 602, root node 604 includes the same pointers as root node 602. Root node 604 includes a first set of pointers to intermediate node 612. The first set of pointers associated with a data key (e.g., "1," "2," "3," or "4") less than or equal to the node key indicates that traversing an object metadata structure included in tree data structure 610 from root node 604 to intermediate node 612 leads to a leaf node with a data key of "1," "2," "3," or "4." Root node 604 includes a second set of pointers to intermediate node 614. The second set of pointers associated with a data key greater than the node key indicates that traversing an object metadata structure included in tree data structure 610 from root node 604 to intermediate node 614 leads to a leaf node with a data key of "5," "6," "7," or "8." Root node 604 includes a NodeID of "OR2" and a TreeID of "2."

Figure 6C:
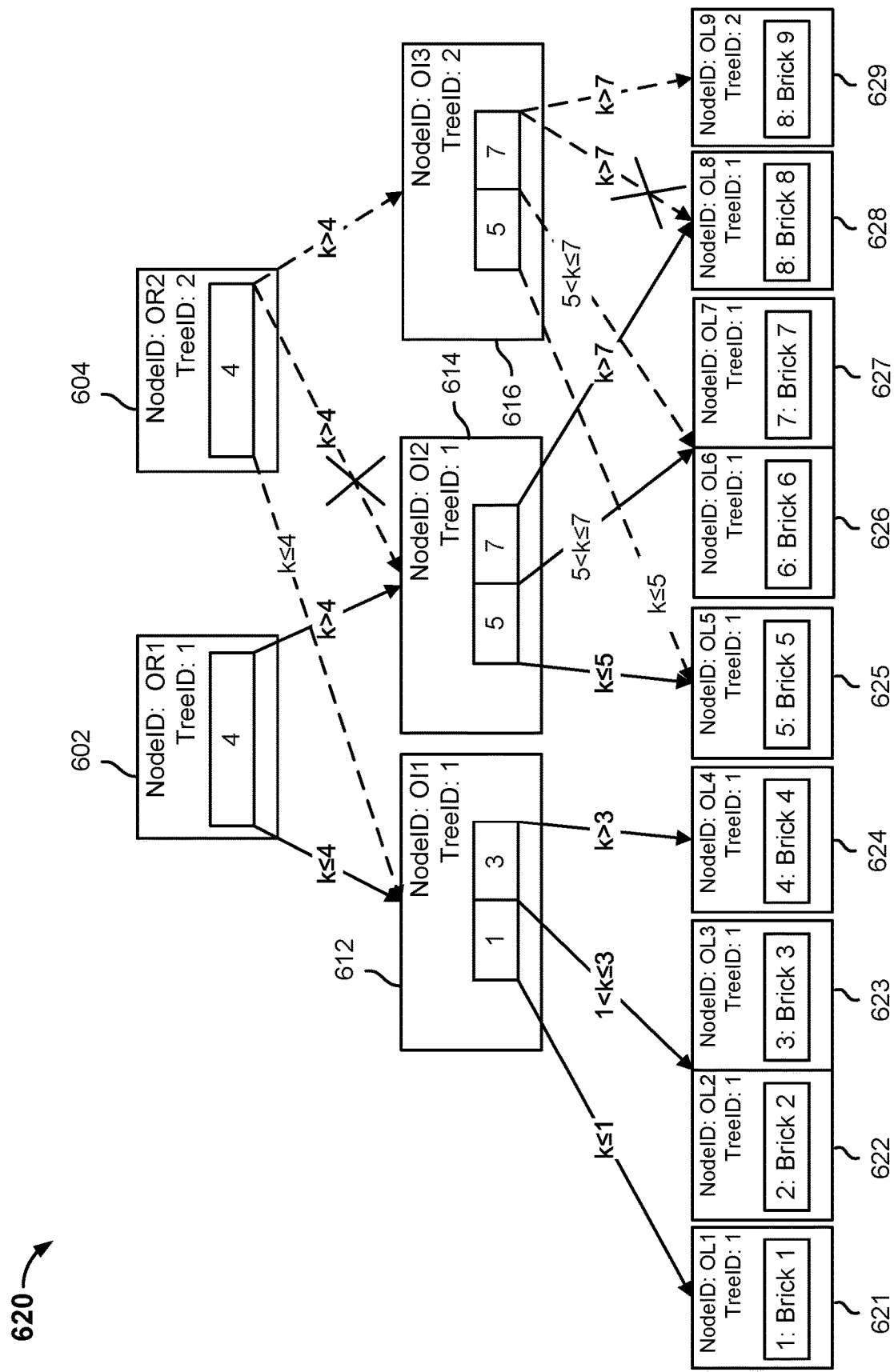
FIG. 6C is a block diagram illustrating an embodiment of modifying a cloned tree data structure.

FIG. 6C is a block diagram illustrating an embodiment of modifying a cloned tree data structure. Tree data structure 620 is comprised of a first object metadata structure that includes root node 602 and a second object metadata structure that includes root node 604. In the example shown, tree data structure 620 may be modified by a file system manager, such as file system managers 115, 167.

In some embodiments, the content data associated with an object file may be modified such that one of the data chunks is replaced by another data chunk. When a data chunk of content data associated with a previous backup snapshot is replaced with a new data chunk, the data brick associated with the new data chunk may be different. To represent this modification to the object data, a corresponding modification is made to a current view of an object metadata structure. The data chunk of the content data that was replaced has a corresponding leaf node in the previous object metadata structure. A new leaf node in the current view of the object metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 9." At $t_1$, the file system manager starts at root node 604 because that is the root node associated with the object metadata structure at time $t_1$. The value "Brick 8" is associated with the data key "8." The file system manager traverses tree data structure 620 from root node 604 until it reaches a target node, in this example, leaf node 628. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 604 and proceeds to intermediate node 614. The file system manager compares the TreeID of intermediate node 614 with the TreeID of root node 604, determines that the TreeID of intermediate node 614 does not match the TreeID of root node 604, and creates a copy of intermediate node 614. The intermediate node copy 616 includes the same set of pointers as intermediate node 614, but includes a TreeID of "2" to match the TreeID of root node 604. The file system manager updates a pointer of root node 604 to point to intermediate node 616 instead of pointing to intermediate node 614. The file system manager traverses tree data structure 620 from intermediate node 616 to leaf node 628, determines that the TreeID of leaf node 628 does not match the TreeID of root node 604, and creates a copy of leaf node 628. Leaf node 629 is a copy of leaf node 628, but stores the brick identifier "Brick 9" and includes the same TreeID as root node 604. The file system manager updates a pointer of intermediate node 616 to point to leaf node 629 instead of pointing to leaf node 628.

Figure 6D:
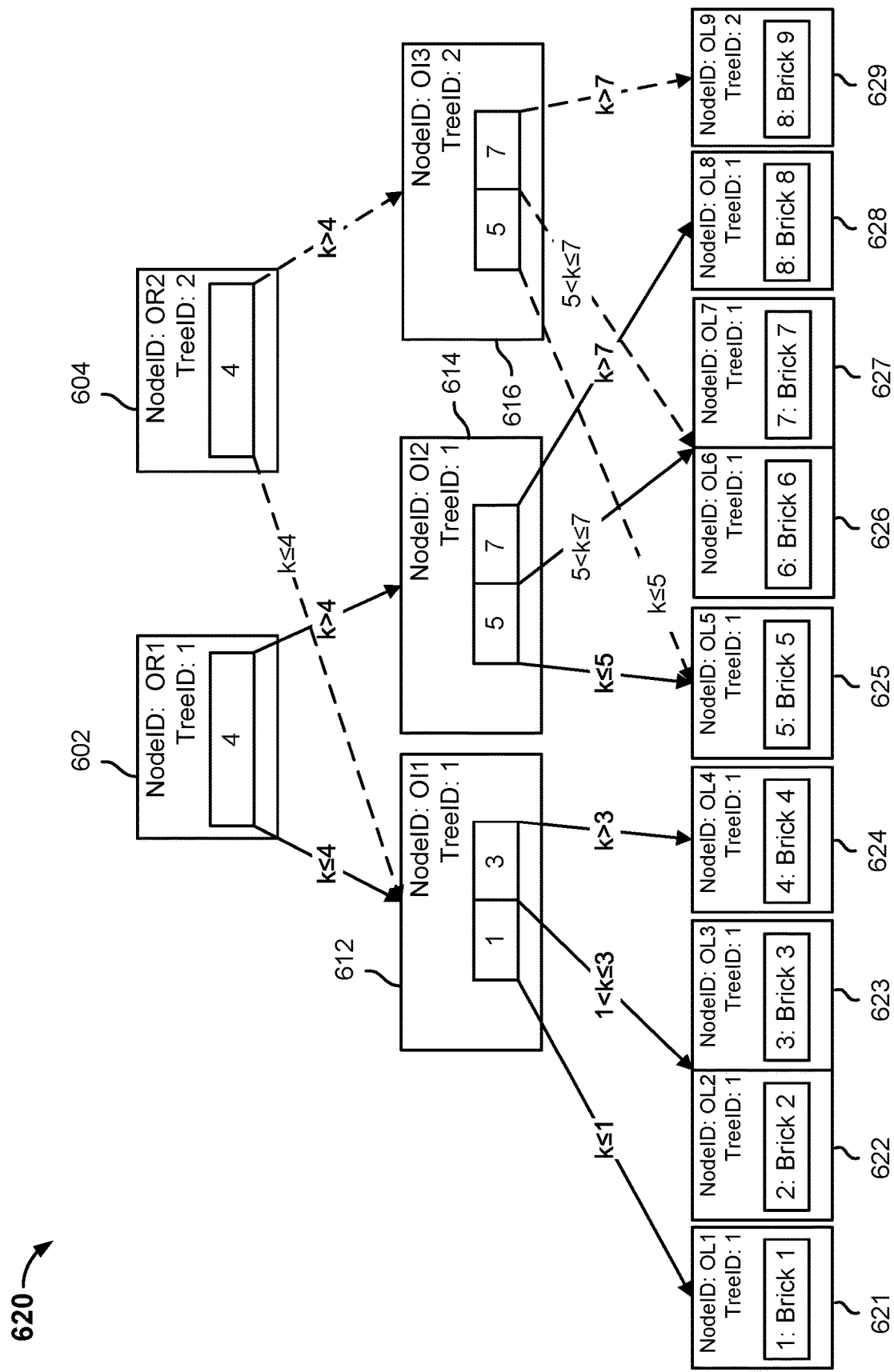
FIG. 6D is a block diagram illustrating an embodiment of a modified tree data structure.

FIG. 6D is a block diagram illustrating an embodiment of a modified tree data structure. The tree data structure 620 shown in FIG. 6D illustrates a result of the modifications made to tree data structure 620 as described with respect to FIG. 6C.

Figure 7A:
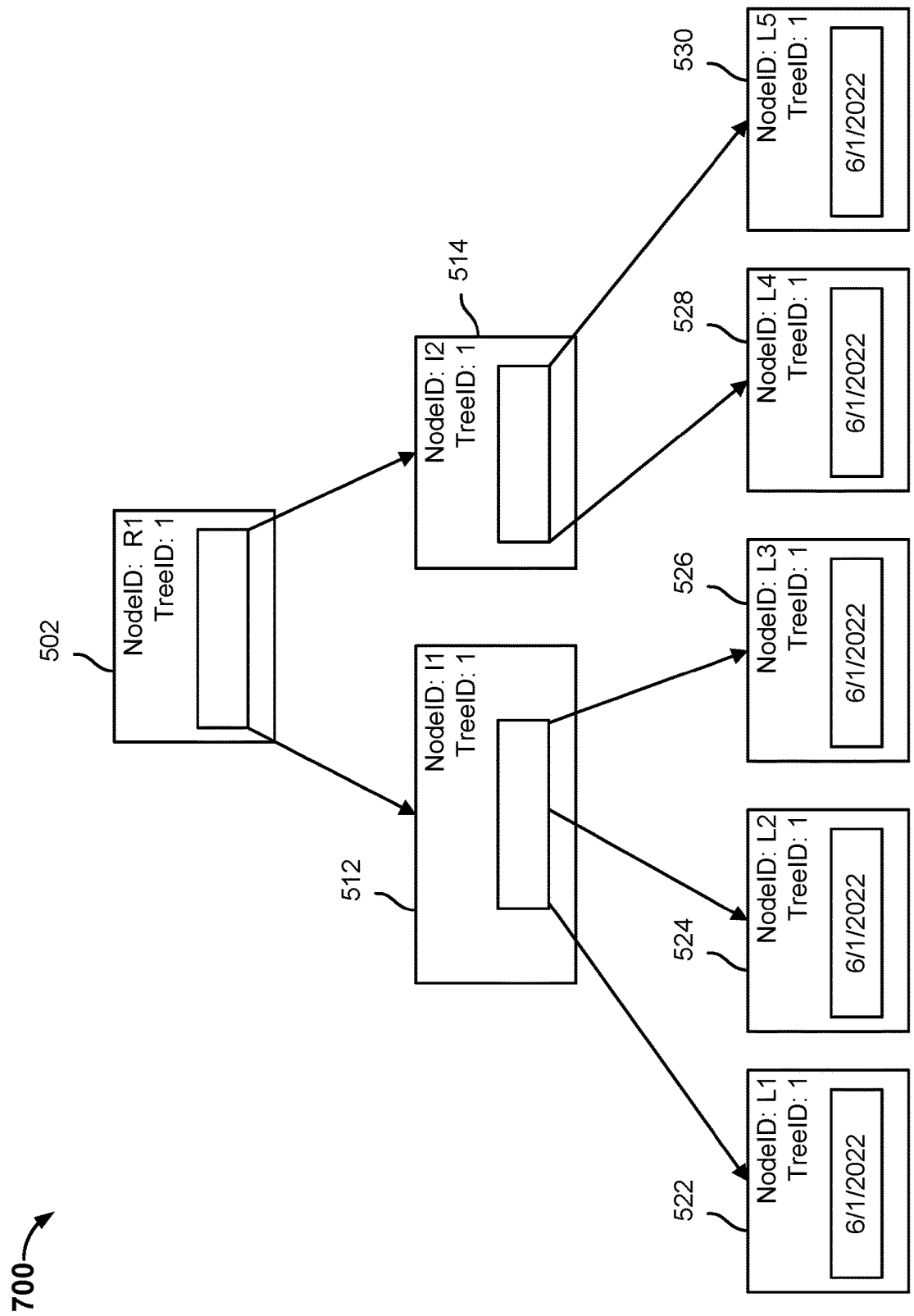
FIGS. 7A-7C illustrate an example of performing a post-order traversal of a tree data structure to store an expiration time.
Figure 7B:
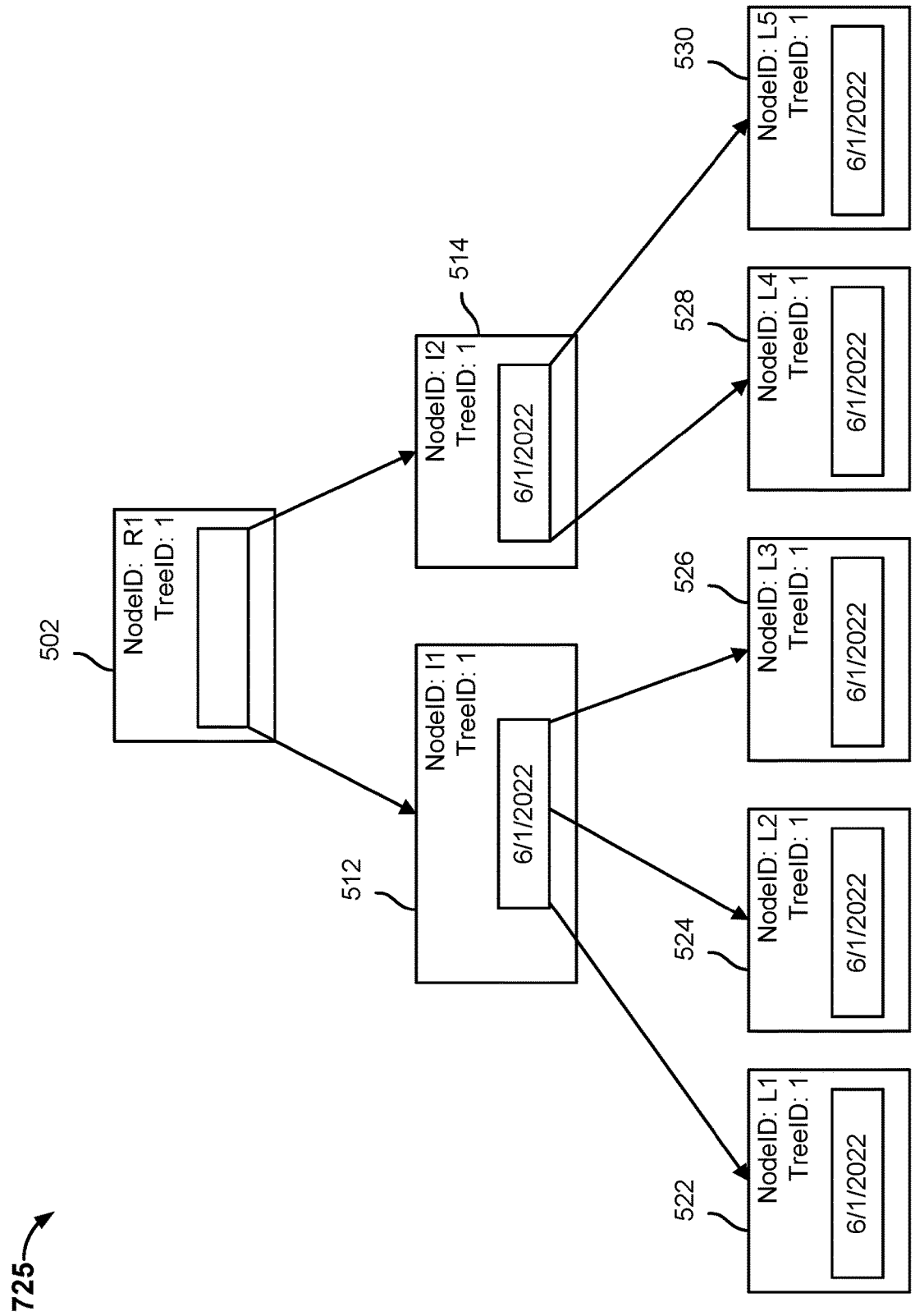
Figure 7C:
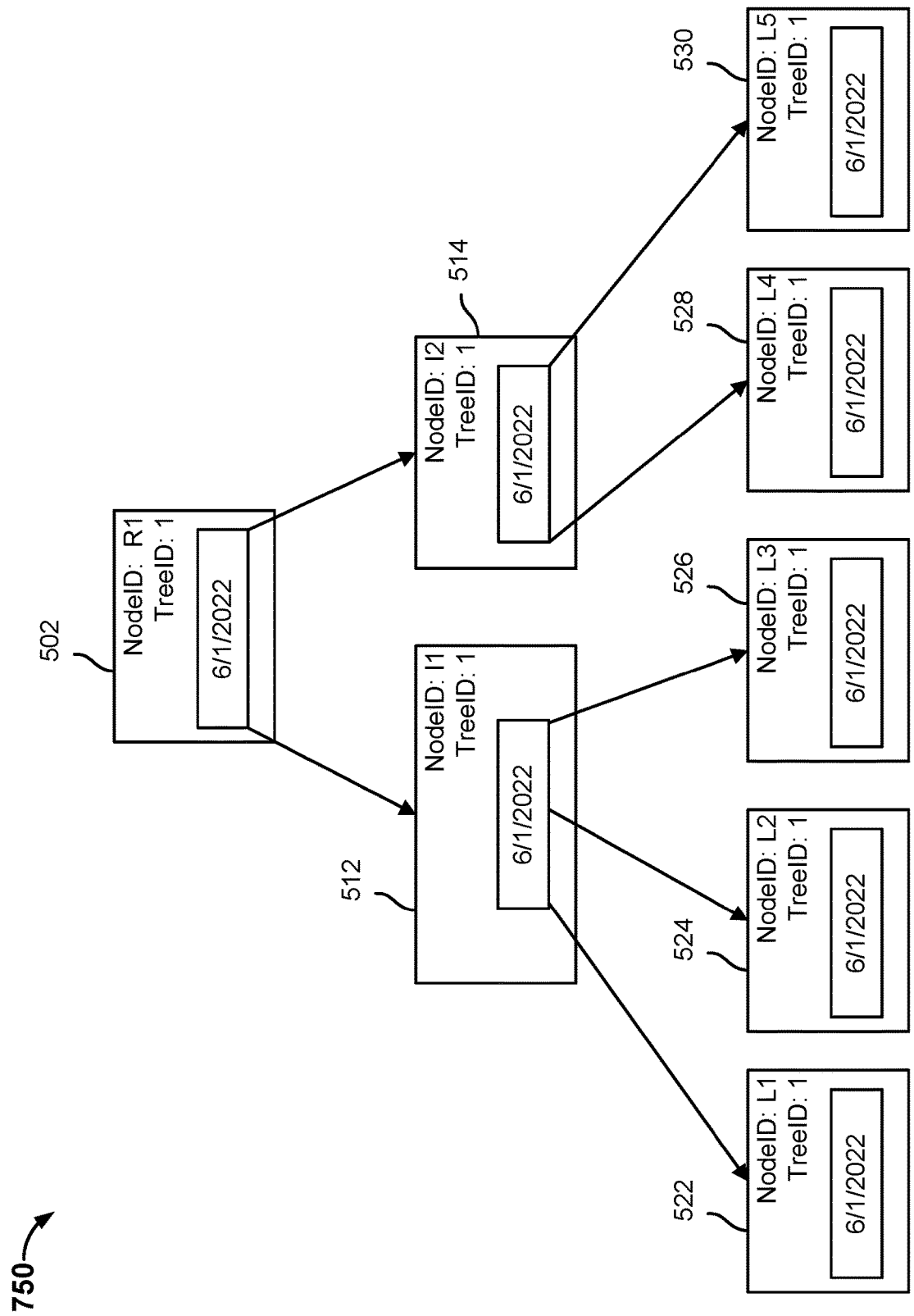

FIGS. 7A-7C illustrate an example of performing a post-order traversal of a tree data structure to store a minimum expiration time. In the example shown, an archive associated with tree data structure 700 is to be archived to a remote storage on 1/1/2022. A data management policy associated with the archive indicates that archived objects associated with the archive have an expiration time of 6/1/2022.

Tree data structure 700 corresponds to a full backup snapshot of a source storage and includes root node 502, intermediate nodes 512, 514, and leaf nodes 522, 524, 526, 528, 530. An archive manager has traversed tree data structure 700 to a leaf level and stored a minimum expiration time in each of the nodes. This indicates that archived objects indirectly referenced by the node will be stored at the remote storage until at least the minimum expiration time stored by the node. In some embodiments, the remote storage does not store any other data besides data associated with the initial archive. In such embodiments, the corresponding minimum expiration time stored by a leaf node is the expiration time associated with the initial archive. In some embodiments, the remote storage already stores data from other sources and data associated with the initial archive is deduplicated against the previously stored data. In such embodiments, the minimum expiration time stored in a leaf node is based on a minimum of an expiration time associated with the initial archive and the minimum child retention time of a tree metadata object associated with the leaf node.

Tree data structure 725 illustrates the archive manager performing a post-order traversal by propagating the expiration time associated with the archive to a level above the leaf node level. At each node, the archive manager compares the corresponding expiration times stored by the child nodes of the nodes and stores the minimum of the corresponding expiration times as the expiration time for the node. In this example, leaf nodes 522, 524, 526 store an expiration time of 6/1/2022. The archive manager stores 6/1/2022 as the expiration time for node 512. Leaf nodes 528, 530 also store an expiration time of 6/1/2022. The archive manager stores 6/1/2022 as the expiration time for node 514.

Tree data structure 750 illustrates the archive manager performing a post-order traversal by propagating the expiration time associated with the archive to a level above the intermediate node, which in the example is a root node level. The archive manager compares the expiration time stored by nodes 512, 514 and stores 6/1/2022 as the expiration time for node 502.

Figure 8:
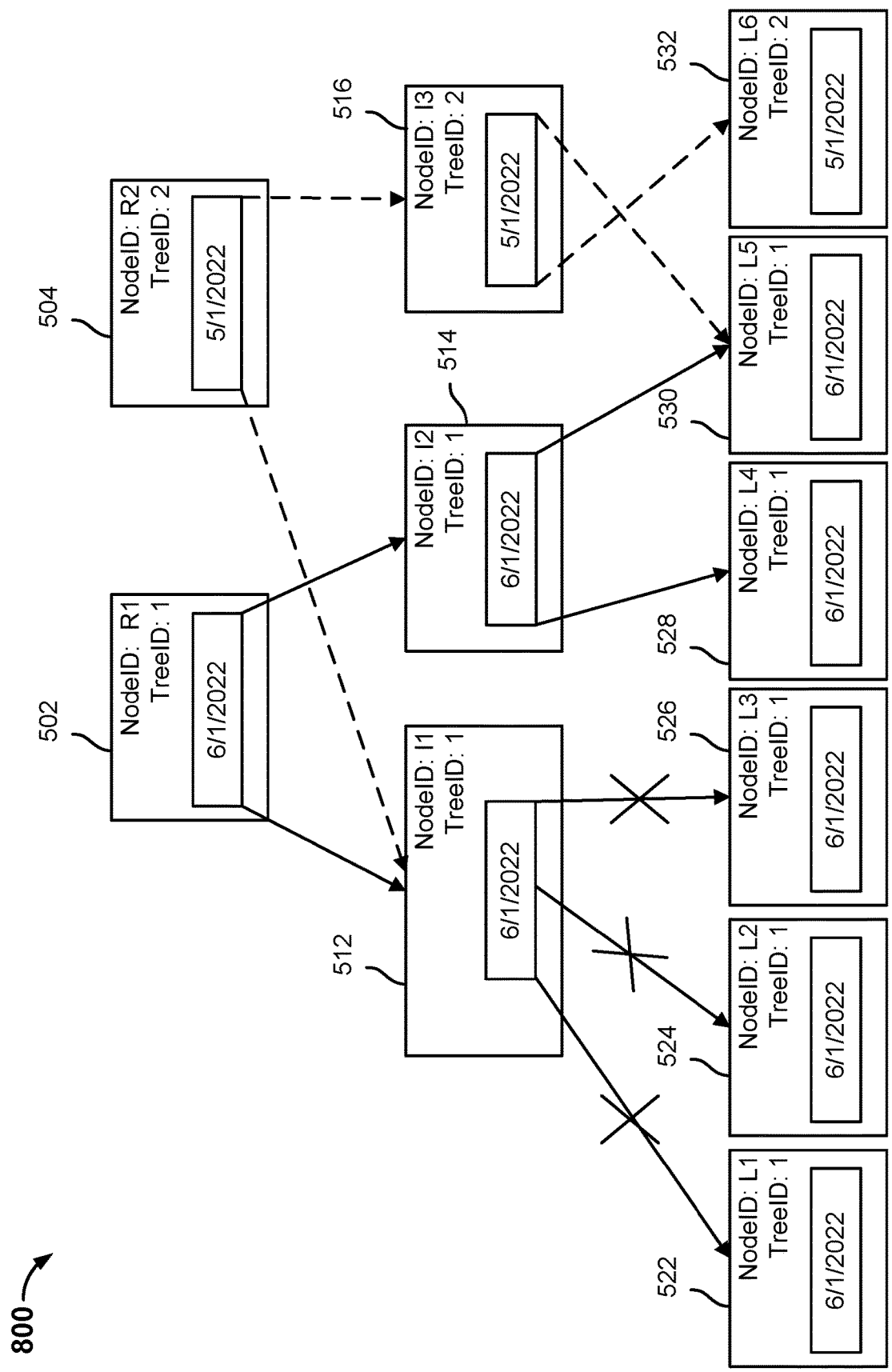
FIG. 8 illustrates an example of performing a compliance scan by traversing a tree data structure corresponding to a subsequent archive.

FIG. 8 illustrates an example of performing a compliance scan by traversing a tree data structure corresponding to a subsequent archive. In the example shown, a tree data structure having a root node of 504 corresponds to an incremental backup snapshot of a source storage and includes root node 504, intermediate nodes 512, 516, and leaf nodes 522, 524, 526, 530, 532. A subsequent archive associated with tree data structure 800 is to be archived to a remote storage on 2/1/2022 and a data management policy associated with the subsequent archive indicates that archived objects associated with the subsequent archive have an expiration time of 5/1/2022.

At each node during the pre-order traversal, the archive manager inspects a node and compares the minimum expiration time stored by the node to an expiration time associated with the subsequent archive. In response to a determination that the minimum expiration time stored by a node expires before the expiration time associated with the subsequent archive, the archive manager further traverses the tree data structure from the node to a child node associated with the node unless the node is a leaf node. In response to a determination that the minimum expiration time stored by the node expires does not expire before the expiration time associated with the subsequent archive, the archive manager does not further traverse the tree data structure to any child nodes associated with the node. Instead, the archive manager traverses the tree data structure corresponding to the subsequent archive to a different node that is located on the same hierarchy level of the tree data structure as the node. The archive determines whether there are any more nodes on the same hierarchy level of the tree data structure. In response to a determination that there is at least one other node that is located on the same hierarchy level of the tree data structure as the node to inspect, the archive manager traverses to that node. In response to a determination that there are no more nodes that are located on the same hierarchy level of the tree data structure as the node to inspect, the traversal of the tree data structure corresponding to the subsequent archive ends.

In this example, node 512 stores an expiration time of 6/1/2022. The archive manager compares 6/1/2022 to the expiration time of 5/1/2022 and determines that it does not need to traverse to any child nodes associated with node 512 (i.e., nodes 522, 524, 526) because any archived object indirectly referenced by node 512 will be complaint with the data management policy associated with the subsequent archive because the archived object(s) will be stored at the remote storage until at least the expiration time stored by node 512. This reduces the amount of time and resources needed to update corresponding expiration times for the one or more archived objects referenced by the subsequent archive to the expiration time associated with the subsequent archive because the child nodes associated with the node do not need to be traversed.

In the event the node does not store an expiration time, the storage system further traverses the tree data structure corresponding to the subsequent archive from the node to a child node unless the node is a leaf node of the tree data structure corresponding to the subsequent archive. In this example, node 516 does not store an expiration time. The archive manager subsequently traverses the tree data structure to nodes 530, 532.

Figure 9:
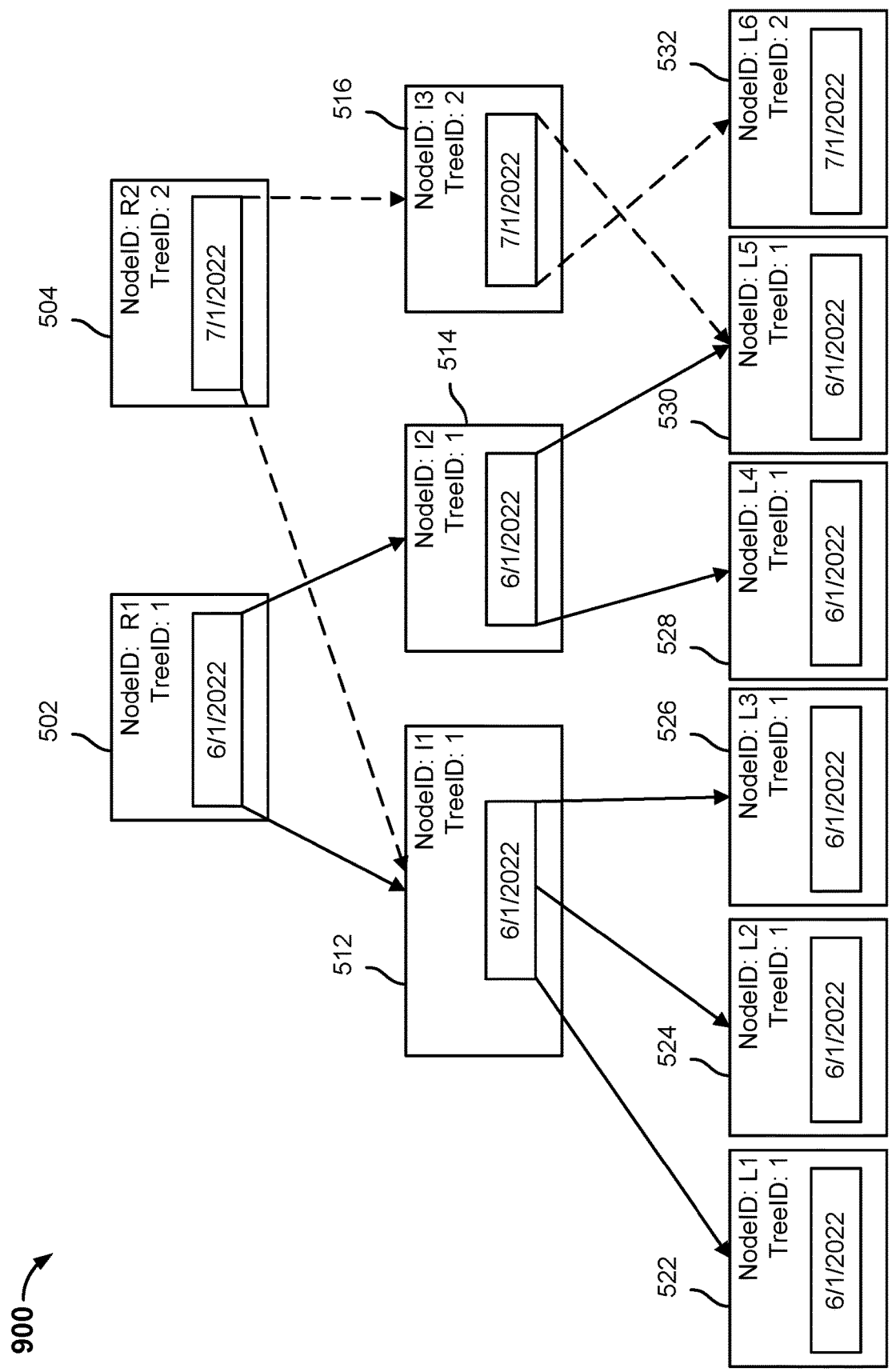
FIG. 9 illustrates an example of performing a compliance scan by traversing a tree data structure corresponding to a subsequent archive.

FIG. 9 illustrates an example of performing a compliance scan by traversing a tree data structure corresponding to a subsequent archive. In the example shown, a tree data structure having a root node of 504 corresponds to an incremental backup snapshot of a source storage and includes root node 504, intermediate nodes 512, 516, and leaf nodes 522, 524, 526, 530, 532. A subsequent archive associated with tree data structure 900 is to be archived at a remote storage on 2/1/2022 and a data management policy associated with the subsequent archive indicates that archived objects associated with the subsequent archive have an expiration time of 7/1/2022.

At each node during the pre-order traversal, the archive manager inspects a node and compares the minimum expiration time stored by the node to an expiration time associated with the subsequent archive. In response to a determination that the minimum expiration time stored by a node expires before the expiration time associated with the subsequent archive, the archive manager further traverses the tree data structure from the node to a child node associated with the node unless the node is a leaf node. In response to a determination that the minimum expiration time stored by the node expires does not expire before the expiration time associated with the subsequent archive, the archive manager does not further traverse the tree data structure to any child nodes associated with the node. Instead, the archive manager traverses the tree data structure corresponding to the subsequent archive to a different node that is located on the same hierarchy level of the tree data structure as the node. The archive determines whether there are any more nodes on the same hierarchy level of the tree data structure. In response to a determination that there is at least one other node that is located on the same hierarchy level of the tree data structure as the node to inspect, the archive manager traverses to that node. In response to a determination that there are no more nodes that are located on the same hierarchy level of the tree data structure as the node to inspect, the traversal of the tree data structure corresponding to the subsequent archive ends.

In this example, node 512 stores an expiration time of 6/1/2022. The archive manager compares 6/1/2022 to the expiration time of 7/1/2022 and determines to traverse to child nodes 522, 524, 526 because any archived object indirectly referenced by node 512 will be stored at the remote storage will not be complaint with the data management policy associated with the subsequent archive.

Figure 10A:
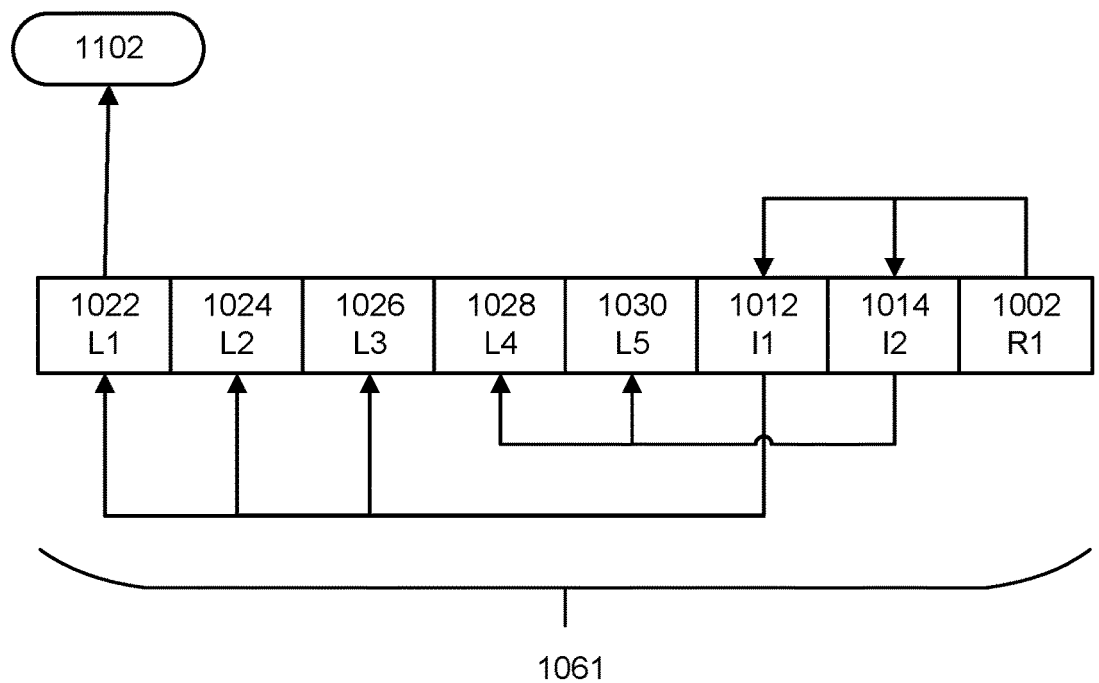
FIG. 10A is a block diagram illustrating a tree metadata object in accordance with some embodiments.

FIG. 10A is a block diagram illustrating a tree metadata object in accordance with some embodiments. Tree metadata object 900 may be generated by an archive manager, such as archive managers 118, 169. A snapshot may be stored locally at a source system, such as source system 103. A snapshot allows the state of a source system to be rolled back to a moment in time for which a snapshot is stored. A source system may store many snapshots (e.g., thousands, millions). Each snapshot may require a significant amount of storage (e.g., GBs, TBs, PBs, etc.). In some instances, it may be desirable to archive a snapshot to a remote storage, such as cloud storage 122. For example, one or more older snapshots may be archived to remote storage location for long-term retention, for data recovery purposes (e.g., other storage systems may access the data associated with a snapshot in the event a storage location that locally stores the snapshot goes offline), to handle spikes in storage demand, and/or to free up local storage for one or more snapshots that include hot data (i.e., data that is accessed frequently).

An archive policy may indicate that a full archive of a snapshot or an incremental archive of the snapshot is to be performed and archived to the remote storage. A full archive includes a complete view of a snapshot at a particular moment in time. An incremental archive provides a complete view of a source system at a particular moment in time, but includes data that was not included in a previous archived to the remove storage. The archive policy may indicate a frequency at which data associated with the source system is archived to remote storage.

As described above, a file system manager may initially generate a snapshot tree and metadata structure(s) to represent a view of a source system at a particular point in time. The file system manager may subsequently serialize the snapshot tree and the object metadata structure(s) into corresponding tree metadata objects that are comprised of a flat set of data. The flat set of data includes a plurality of data blocks where each data block of the flat set of data corresponds to a node of the tree data structure. A data block that corresponds to a root node or intermediate node of the tree data structure includes a file offset to another data block of a flat set of data. A data block that corresponds to a leaf node of a snapshot tree includes a file offset to a data block corresponding to a root node of an object metadata structure. A data block that corresponds to a leaf node of an object metadata structure includes a reference to a storage location for one or more data chunks with which the leaf node is associated (e.g., a chunk object). A storage of a storage node or a cloud server (e.g., EC2 instance) that stores the metadata may be less reliable and/or more expensive the cloud storage (e.g., S3). The metadata for the one or more data chunks may be serialized and stored at cloud storage to ensure that the metadata for the one or more data chunks is not lost in the event the storage of a storage node or a cloud server fails.

A tree metadata object corresponding to a full archive may include a root node associated with the view at the particular moment in time (e.g., t0), any intermediate nodes associated with the root node, and any leaf nodes associated with the root node. A tree metadata object corresponding to a full archive does not include a data block corresponding to a node of a previous version of a snapshot tree. An example of a tree metadata object associated with a full archive is depicted in FIG. 10A. The tree metadata object 1000 includes a flat set of data 1061. The flat set of data 1061 corresponds to the tree data structure depicted in FIG. 6A.

Tree data structure 500 is an example of a snapshot tree and includes root node 502, intermediate nodes 512, 514, and leaf nodes 522, 524, 526, 528, and 530. Tree metadata object 1000 is a serialized version of tree data structure 500. Each data block of flat set of data 1061 corresponds to a node of tree data structure 500. A data block may contain a file offset. A file offset represents of pointer of a snapshot tree. A file offset is used in place of pointers because some archive systems cannot store pointers. The file offset may be to another data block of the serialized snapshot tree data. The file offset may be to another data block of a different serialized snapshot tree data.

In the example shown, data blocks 1022, 1024, 1026, 1028, 1030, 1012, 1014, and 1002 of flat set of data 1061 correspond to nodes 522, 524, 526, 528, 530, 512, 514, and 502 of tree data structure 500, respectively. Data block 1022 includes a file offset to data block 1102, which corresponds to root node 602 of tree data structure 600.

Figure 10B:
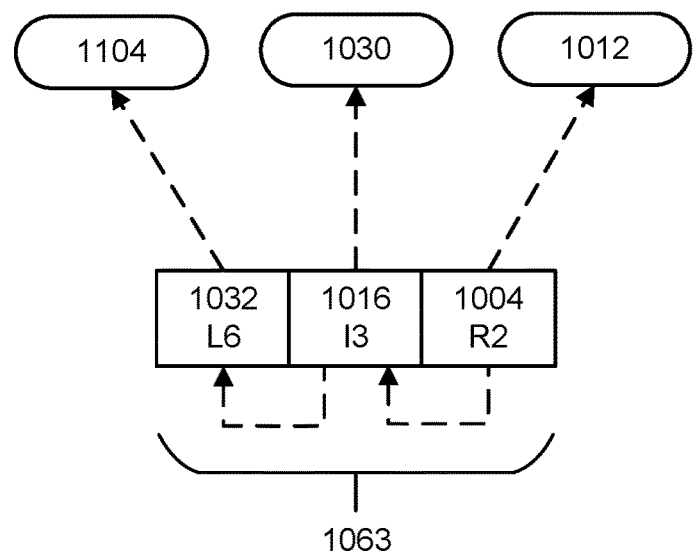
FIG. 10B is a block diagram illustrating a tree metadata object in accordance with some embodiments.

FIG. 10B is a block diagram illustrating a tree metadata object in accordance with some embodiments. Tree metadata object 1050 may be generated by an archive manager, such as archive managers 118, 169.

A tree metadata object corresponding to an incremental archive may include a root node associated with the view at a particular moment in time (e.g., $t_1$), any intermediate nodes associated with the root node, and any leaf nodes associated with the root node, and includes at least one data block that stores a file offset to another data block of a flat set of data associated with a different archive.

In the example shown, tree metadata object 1050 is an example of a tree metadata object associated with an incremental archive and includes a flat set of data 1063. The flat set of data 1063 corresponds to the tree data structure depicted in FIG. 5D.

Tree data structure 575 is an example of two snapshot trees that are linked together. The snapshot tree with root node 502 corresponds to a state of a source system at a first point in time $t_0$ and the snapshot tree with root node 504 corresponds to a state of the source system at the second point in time $t_1$. Between $t_0$ and $t_1$, the value associated with data key 6 has changed from "DATA6" to "DATA6'". The snapshot tree with root node 504 includes root node 504, intermediate nodes 512, 516, and leaf nodes 522, 524, 526, 530, 532.

The flat set of data 1063 includes data blocks 1032, 1016, 1004. These data blocks correspond to nodes 532, 516, 504 of tree data structure 575. The flat set of data 1063 does not include data blocks that correspond to nodes 512, 522, 524, 526, and 530 because data blocks corresponding to those nodes were already stored at the remote storage in the flat set of data 1061. Instead of storing duplicate data blocks for theses nodes, the flat set of data 1063 includes file offsets to data blocks included in the flat set of data 1061. Data block 1004 stores a file offset to data block 1012 because root node 504 stores a pointer to intermediate node 512. Data block 1016 stores a file offset to data block 1030 because intermediate node 516 stores a pointer to leaf node 530. Data block 1032 includes a file offset to block 1104, which corresponds to root node 604 of tree data structure 620.

Figure 11A:
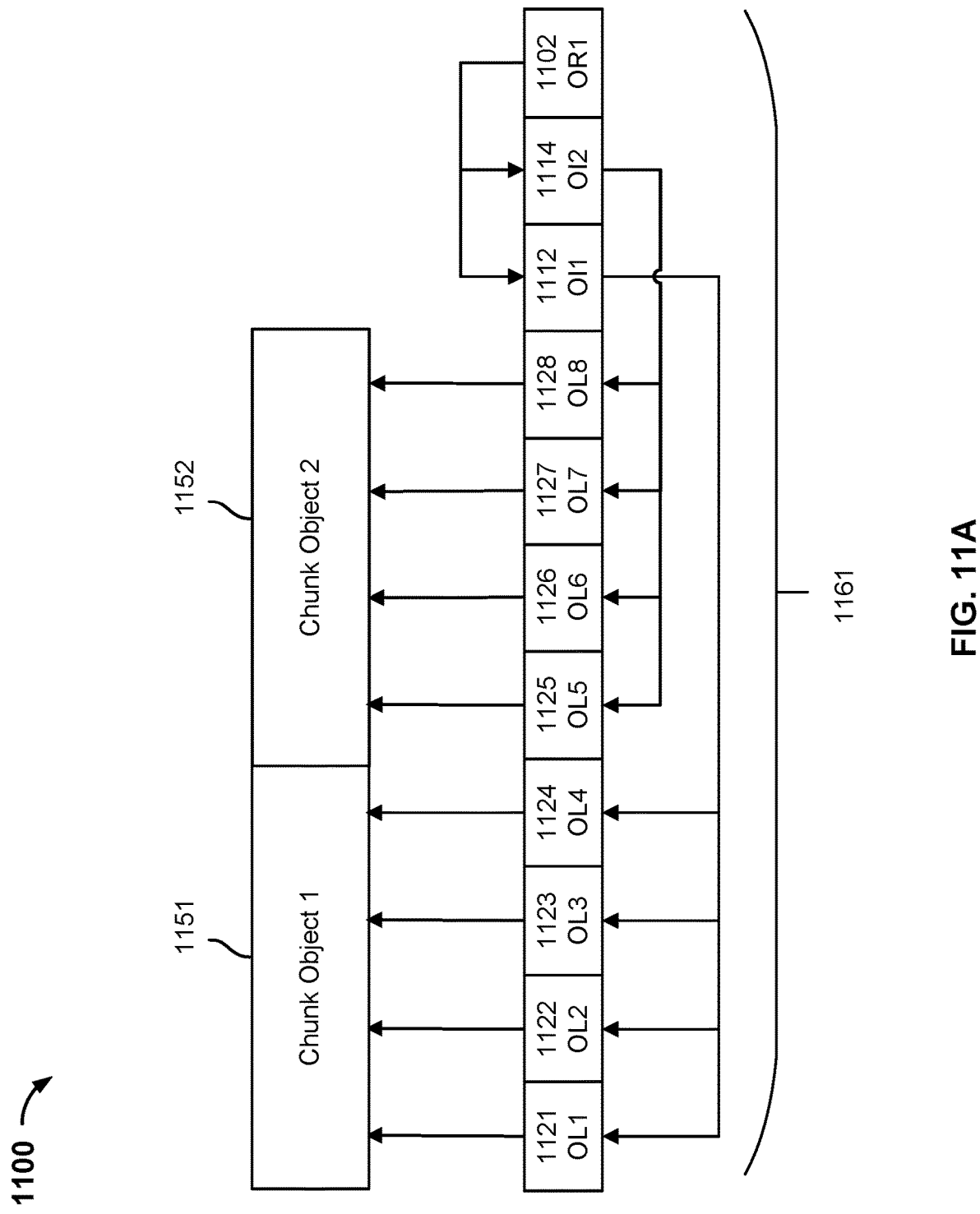
FIG. 11A is a block diagram illustrating a tree metadata object in accordance with some embodiments.

FIG. 11A is a block diagram illustrating a tree metadata object in accordance with some embodiments. Tree metadata object 1100 may be generated by an archive manager, such as archive managers 118, 169.

In the example shown, tree metadata object 1100 corresponds to a full archive of an object stored at a source system at a particular point in time to. The flat set of data 1161 corresponds to the tree data structure depicted in FIG. 6A.

Metadata structure 600 provides a view of the object stored at the source system at $t_0$. Tree metadata object includes root node 602, intermediate nodes 612, 614, and leaf nodes 621, 622, 623, 624, 625, 626, 627, 628. Each of the leaf nodes store corresponding data brick identifiers.

Tree metadata object 1100 is a serialized version of metadata structure 600. Each block of the flat set of data 1161 corresponds to a node of tree data structure 600. Data blocks 1121, 1122, 1123, 1124, 1125, 1126, 1127, 1128, 1112, 1114, and 1102 correspond to nodes 621, 622, 623, 624, 625, 626, 627, 628, 612, 614, and 602, respectively. Data blocks 1121, 1122, 1123, 1124 store corresponding chunk offsets of data chunks stored in chunk object 1151. Data blocks 1125, 1126, 1127, 1128 store corresponding chunk object offsets for data chunks in chunk object 1152.

Figure 11B:
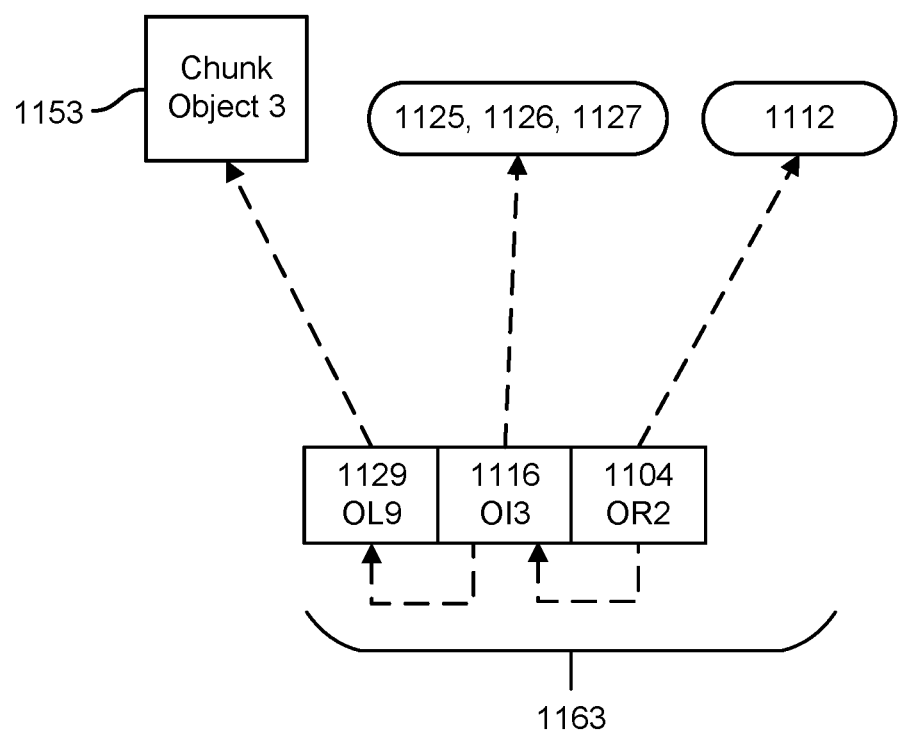
FIG. 11B is a block diagram illustrating a tree metadata object in accordance with some embodiments.

FIG. 11B is a block diagram illustrating a tree metadata object in accordance with some embodiments. Tree metadata object 1150 may be generated by an archive manager, such as archive managers 118, 169.

In the example shown, tree metadata object 1150 corresponds to an incremental of an object stored at a source system at a particular point in time $t_1$. The flat set of data 1163 corresponds to the tree data structure depicted in FIG. 6D.

Tree data structure 620 is an example of two metadata structures that are linked together. The object metadata structure with root node 602 corresponds to a state of an object stored at a source system at a first point in time to and the object metadata structure with root node 604 corresponds to a state of an object stored at the source system at the second point in time $t_1$. Between $t_0$ and $t_1$, the value associated with data key 8 has changed from "Brick 8" to "Brick 9". The object metadata structure with root node 604 includes root node 604, intermediate nodes 612, 616, and leaf nodes 621, 622, 623, 624, 625, 626, 627, 629.

The flat set of data 1163 includes data blocks 1129, 1116, 1104. These data blocks correspond to nodes 629, 616, 604 of tree data structure 620. The flat set of data 1163 does not include data blocks that correspond to nodes 612, 621, 622, 623, 624, 625, 626, and 627 because data blocks corresponding to those nodes were already stored at the remote storage in the flat set of data 1161. Instead of storing duplicate data blocks for theses nodes, the flat set of data 1163 includes file offsets to data blocks included in the flat set of data 1161. Data block 1104 stores a file offset to data block 1112 because root node 604 stores a pointer to intermediate node 612. Data block 1116 stores file offsets to data blocks 1125, 1126, and 1127 because intermediate node 616 stores pointers to leaf node 625, 626, and 627. Block 1129 includes a chunk offset for a data chunk stored in chunk object 1153.

Figure 12:
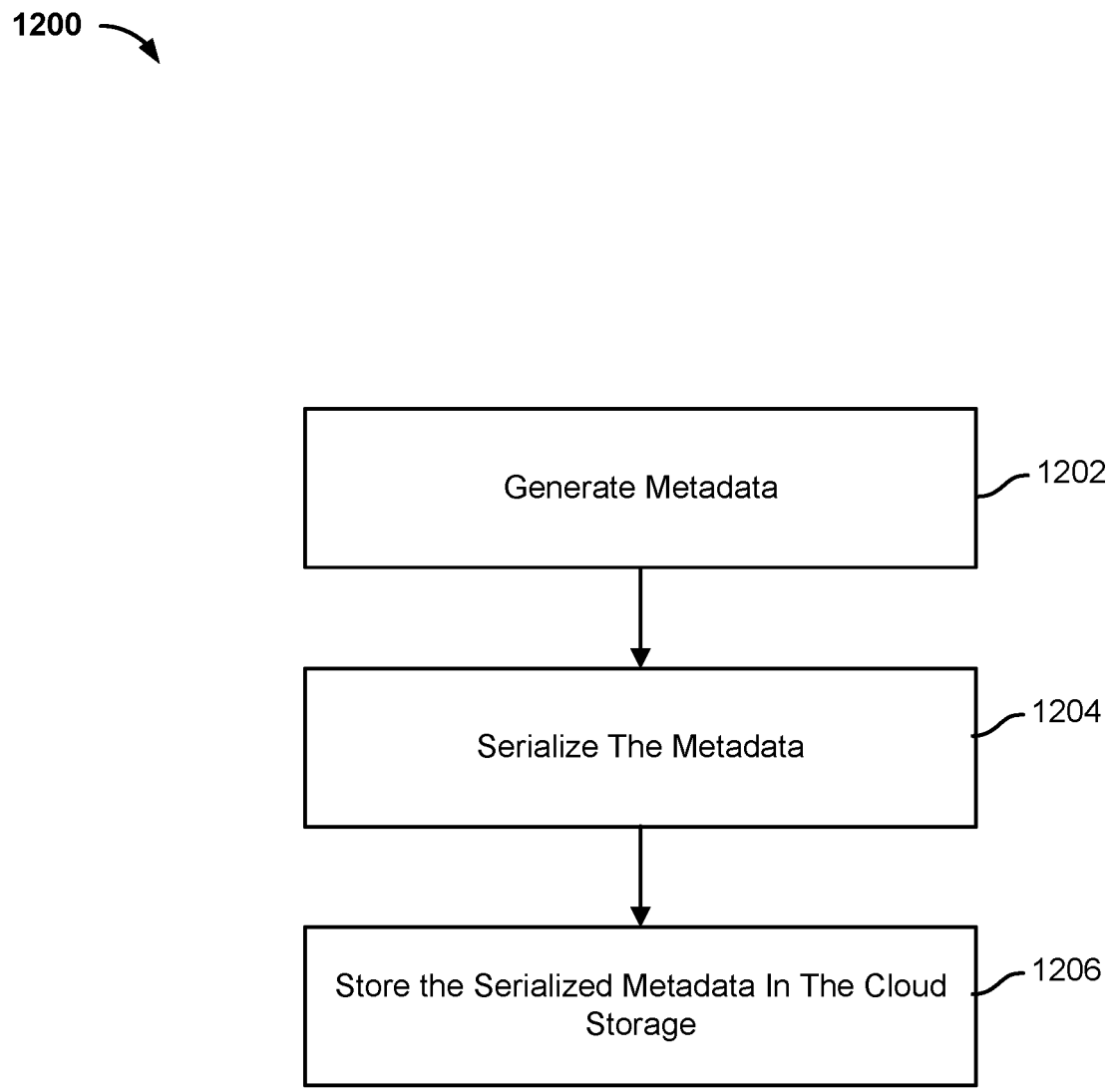
FIG. 12 is a flow diagram illustrating a process for generating tree metadata objects in accordance with some embodiments.

FIG. 12 is a flow diagram illustrating a process for generating tree metadata objects in accordance with some embodiments. In the example shown, process 1200 may be implemented by a cloud server, such as one of the one or more cloud servers 113. In some embodiments, process 1200 may be implemented by a storage system, such as storage system 105.

At 1202, metadata is generated for data that is to be archived to a remote storage. A file system manager is configured to generate metadata (e.g., tree data structures, chunk metadata data structure, chunk object metadata data structure, archive metadata) that enables the one or more data chunks that were written to cloud storage to be located and provides a view (partial or complete) of the source system at a particular moment in time.

At 1204, the generated metadata is serialized into one or more data files comprising a flat set of data. The flat set of data includes a plurality of data blocks where each data block of the flat set of data corresponds to a node of the tree data structure. The flat set of data may be referred to as a tree metadata object.

At 1206, the serialized metadata is stored in the cloud storage. The generated metadata for the one or more data chunks may be serialized and stored at cloud storage to ensure that the metadata for the one or more data chunks is not lost in the event the storage of a storage node or a cloud server fails.

Steps 1204 and 1206 may be periodically (e.g., daily, weekly, bi-monthly, monthly, etc.) performed. In some embodiments, steps 1204 and 1206 are performed after a particular amount of time has passed after an archive has completed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by an archive manager for a source storage, to archive an object associated with the source storage to an archive of a remote storage;
   storing, by a file system manager for the remote storage, a minimum expiration time in a node of a tree data structure associated with the archive that represents an archived object corresponding to the object associated with the source storage;
   traversing, by the archive manager, a portion of the tree data structure to identify one or more nodes associated with the archived object having a corresponding minimum expiration time expiring before an expiration time associated with the archive;
   updating, by the archive manager, in the identified one or more nodes, the corresponding minimum expiration time according to the expiration time associated with the archive; and
   deleting, by the remote storage and based on the respective, updated minimum expiration times in the identified one or more nodes of the tree data structure, one or more archived objects, the one or more archived objects associated with the identified one or more nodes.

2. The method of claim 1, wherein the object associated with the source storage is determined to be archived to the remote storage based on one or more conditions associated with an archive policy being satisfied.

3. The method of claim 2, wherein the one or more conditions associated with the archive policy are associated with at least one of: a certain amount of time passing since a previous archive; a threshold amount of data being changed since a previous backup snapshot; in response to a user command, a threshold number of incremental backup snapshots being performed since a previous archive; a frequency at which an object is modified within a particular time period; and/or legal compliance.

4. The method of claim 1, wherein the expiration time associated with the archive is specified by a data management policy associated with the archive.

5. The method of claim 1, wherein the one or more archived objects are associated with one or more previous archives.

6. The method of claim 1, wherein traversing the portion of the tree data structure associated with the archive includes comparing an expiration time stored by a node of the tree data structure to the expiration time associated with the archive.

7. The method of claim 6, wherein traversing the portion of the tree data structure associated with the archive includes traversing the tree data structure corresponding to the archive from the node to a child node in response to a determination that the minimum expiration time stored by the node expires before the expiration time associated with the archive.

8. The method of claim 6, wherein traversing the portion of the tree data structure associated with the archive includes traversing the tree data structure corresponding to the archive from the node to a different node that is on a same hierarchy level as the node in the event the minimum expiration time stored by the node does not expire before the expiration time associated with the archive.

9. The method of claim 1, wherein storing the minimum expiration time in the node of the tree data structure includes: storing the minimum expiration time in a leaf node of the tree data structure, and wherein traversing the portion of the tree data structure includes: at each node above a leaf node level of the tree data structure, comparing respective minimum expiration times of child leaf nodes associated with the node.

10. The method of claim 9, wherein storing the minimum expiration time in the node of the tree data structure further includes storing in the node a minimum of the respective minimum expiration times of the child leaf nodes associated with the node.

11. The method of claim 9, wherein the minimum expiration time associated with a leaf node is based on a minimum of the expiration time associated with the archive and a minimum child retention time of a tree metadata object associated with the leaf node.

12. The method of claim 1, further comprising archiving the tree data structure associated with archive.

13. The method of claim 1, further comprising causing storage of the archive to the remote storage.

14. The method of claim 1, further comprising setting an expiration time associated with the object included in the archive to be the expiration time associated with the archive.

15. The method of claim 14, wherein the expiration time associated with the archive is based on an expiration of a data lock period.

16. The method of claim 15, wherein a data management policy associated with the archive specified the expiration of the data lock period.

17. Non-transitory computer readable media comprising computer instructions that, when executed by one or more processors, causes the one or more processors to:
   determine to archive an object associated with a source storage to an archive of a remote storage;
   store a minimum expiration time in a node of a tree data structure associated with the archive that represents an archived object corresponding to the object associated with the source storage;
   traverse a portion of the tree data structure associated with the archive to identify one or more nodes associated with the archived object having a corresponding minimum expiration time expiring before an expiration time associated with the archive;
   update, in the identified one or more nodes, the corresponding minimum expiration time according to the expiration time associated with the archive; and
   delete, based on the respective, updated minimum expiration times in the identified one or more nodes of the tree data structure, one or more archived objects, the one or more archived objects associated with the identified one or more nodes.

18. A system, comprising:
memory; and
one or more processors having access to the memory and configured to:
   determine to archive an object associated with a source storage to an archive of a remote storage;
   store a minimum expiration time in a node of a tree data structure associated with the archive that represents an archived object corresponding to the object associated with the source storage;
   traverse a portion of the tree data structure associated with the archive to identify one or more nodes associated with the archived object having a corresponding minimum expiration time expiring before an expiration time associated with the archive;
   update, in the identified one or more nodes, the corresponding expiration time according to the expiration time associated with the archive; and
   delete, based on the respective, updated minimum expiration times in the identified one or more nodes of the tree data structure, one or more archived objects, the one or more archived objects associated with the identified one or more nodes.

* * * * *